United States Patent [19]

Itai

[11] 4,404,607

[45] Sep. 13, 1983

[54] MAGNETIC REPRODUCING APPARATUS

[75] Inventor: Humio Itai, Yokohama, Japan

[73] Assignee: Tokyo Shibaura Denki Kabushiki Kaisha, Kawasaki, Japan

[21] Appl. No.: 265,076

[22] Filed: May 18, 1981

[30] Foreign Application Priority Data

Jun. 13, 1980 [JP] Japan .................................. 55-79796

[51] Int. Cl.[3] ................................................ G11B 5/52

[52] U.S. Cl. ...................................................... 360/105

[58] Field of Search .......................... 360/137, 105, 62

[56] References Cited

U.S. PATENT DOCUMENTS 4,131,922 12/1978 Yoshiba et al. ..................... 360/105
4,170,789 10/1979 Inoue .................................. 360/137
4,232,349 11/1980 Kobayashi .......................... 360/137

FOREIGN PATENT DOCUMENTS 2318085 10/1974 Fed. Rep. of Germany .
2659023 7/1977 Fed. Rep. of Germany .
2911568 2/1980 Fed. Rep. of Germany .
5151205 of 0000 Japan .
5223928 of 0000 Japan .
904095 8/1962 United Kingdom .
1366063 9/1974 United Kingdom .
2034098A 5/1980 United Kingdom .

*Primary Examiner*—Vincent P. Canney
*Attorney, Agent, or Firm*—Schuyler, Banner, Birch, McKie & Beckett

[57] ABSTRACT

A magnetic reproducing apparatus includes reproducing operation slider movably mounted on a main chassis. A head lever, which is positioned at approximately a right angle to the reproducing operation slider, is mounted on the reproducing operation slider. A magnetic head is attached to one end of the head lever. The other end of the head lever is linked via a biasing device to the reproducing operation slider or a reproducing button attached to one end of the slider. A regulating device maintains the head lever at approximately a right angle to the reproducing operation slider when the reproducing button is depressed.

4 Claims, 36 Drawing Figures

15
16
19
17
18
B
A
38
35
28
D
C
29
30
33
32
39
37
E
40
31
34
36
42
41
D
12
43

37
94
309
55
43
432
431
541
309
551
551
40
18
775
34
54
308
89
66
77
17
31
461
39
62
811
81
812
594
464
46
33
765
662
36
301
47
591
592
463
38
60
502
59
16
69
45
304
32
321
308
44
302
462
593
641
764
598
64
784
767
595
597
53
52
307
521
35
491
306
492
49
78
50
503
501
642
15
48
281
28
30

93
91
92
921
811
94
81
89
80
812
793
79
792
33
794
H
I
795
791
83
782
783
J
78
772
785
781
784
77
774
773
N
762
776
771
761
763
764
765
766
755
82
754
757
462
K
753
L
305
46
84
752
301
758
461
90
463
85
759
851
751
871
852
87
86
88

33
38
39
851
85
611
62
623
641
59
662
765
76
60
61
598
764
65
16
O
15
63
64
723
642
724
726
725
162
722
721
72

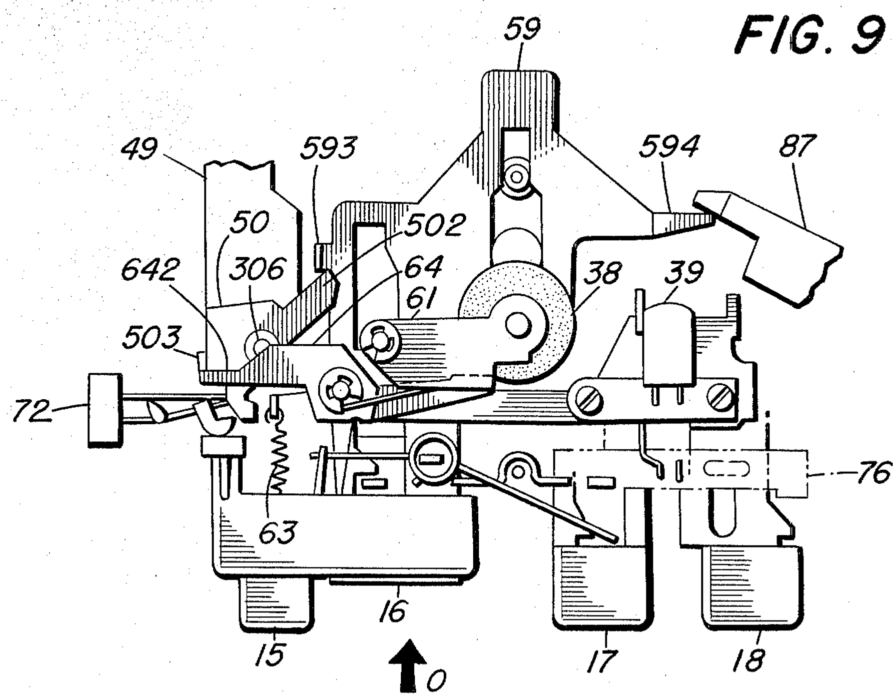
59
FIG. 9
49
593
594
87
50
502
642
306
64
38
39
61
503
72
76
63
16
15
17
18
O
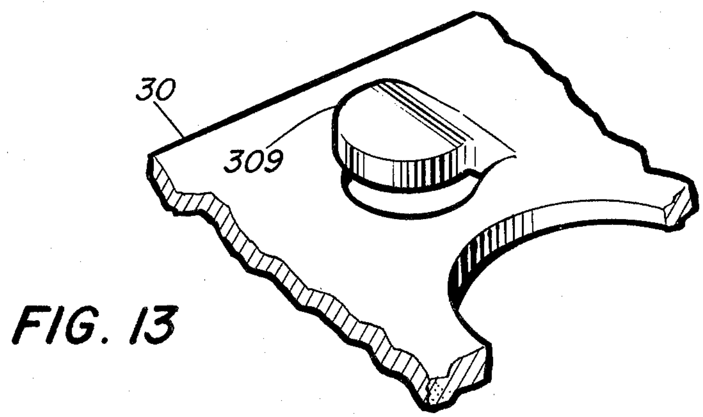
30
309
FIG. 13
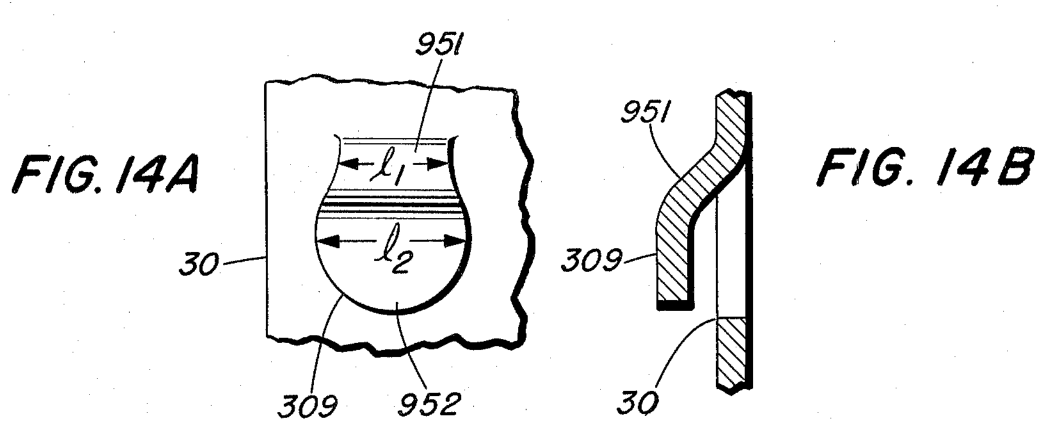
951
FIG. 14A
$l_1$
$l_2$
30
309
952
951
309
30
FIG. 14B 39
851
85
38
33
61
60
64
642
595
662
765
17
0
62
623
641
611
76
59
598
764
16
15
65
63

753
80
775
795
791
792
812
774
811
773
81
77
47

753
79
80
755
795
791
812
774
811
777
81
77

35
99
307

99
351
428
426
42
425
305
424
52
59
30

35

99
426
42
99
425
351
424
52
59
30

78
83
44
84
89
98
19
45
33
92
79
811
46
76
59
17
85
776
66
47
18
77
87
94
37

871
411
R
87
77
594
59
89
Q
41
76
98
78
18
17
19
16
15

411
V
87
86
T
77
594
59
89
41
76
S
98
78
18
17
19
16
15

411
U
87
871
86
T
77
89
41
W
S
76
98
18
17
78
19
16
15

R
871
411

77
852
776
X
851
89
85
76
18
98
78
17
19
16
15

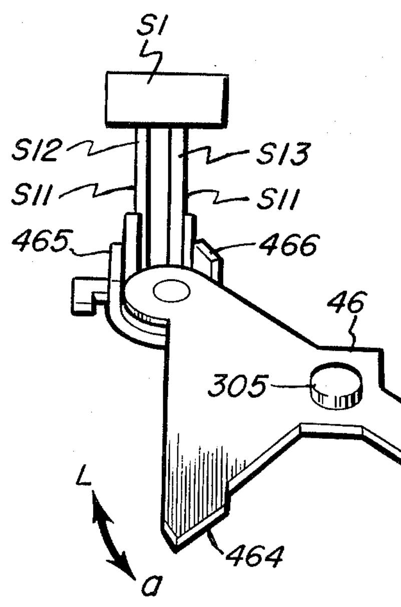
FIG. 31
FIG. 27a
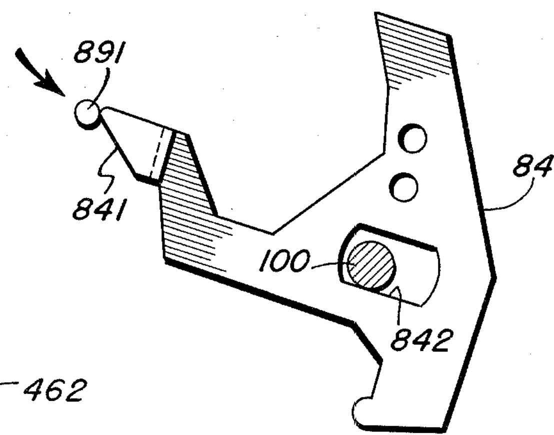
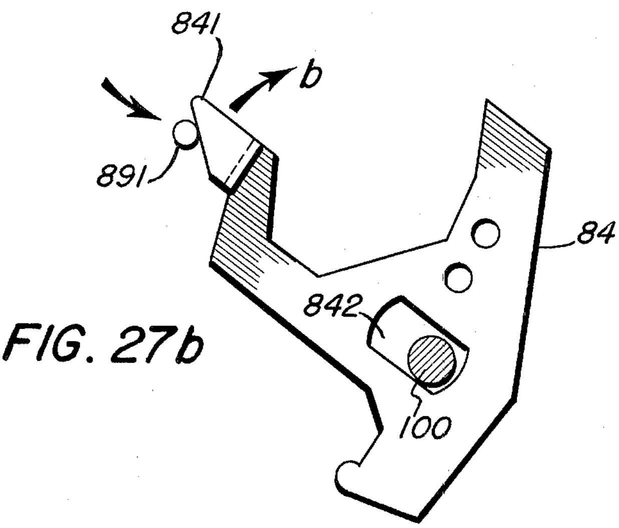
FIG. 27b
FIG. 32
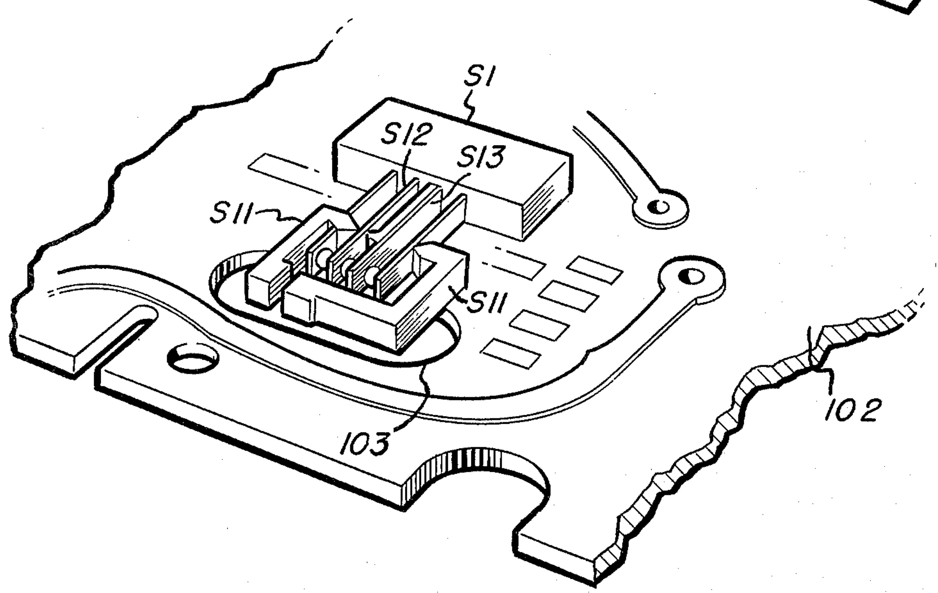

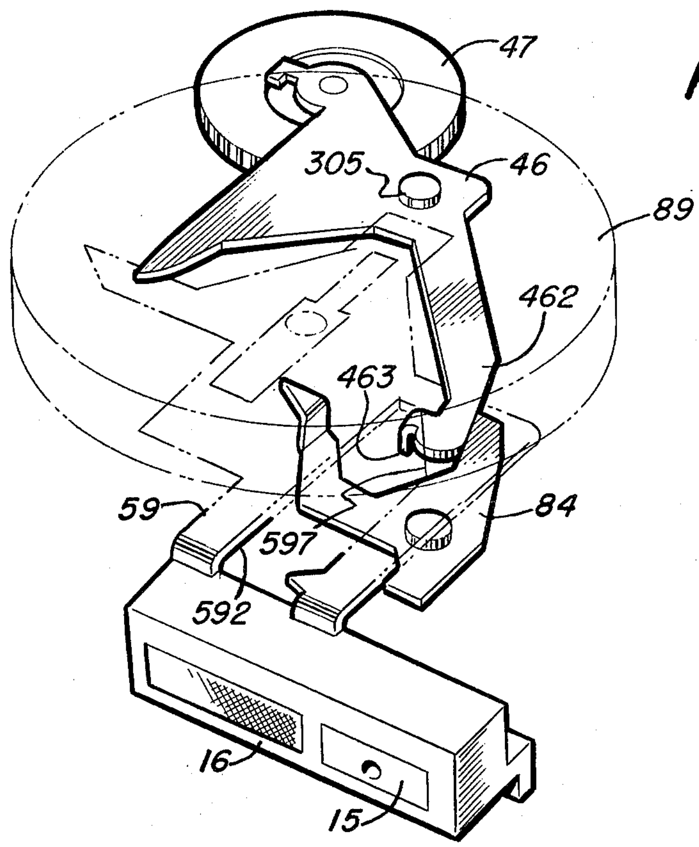
FIG. 28a
FIG. 28b
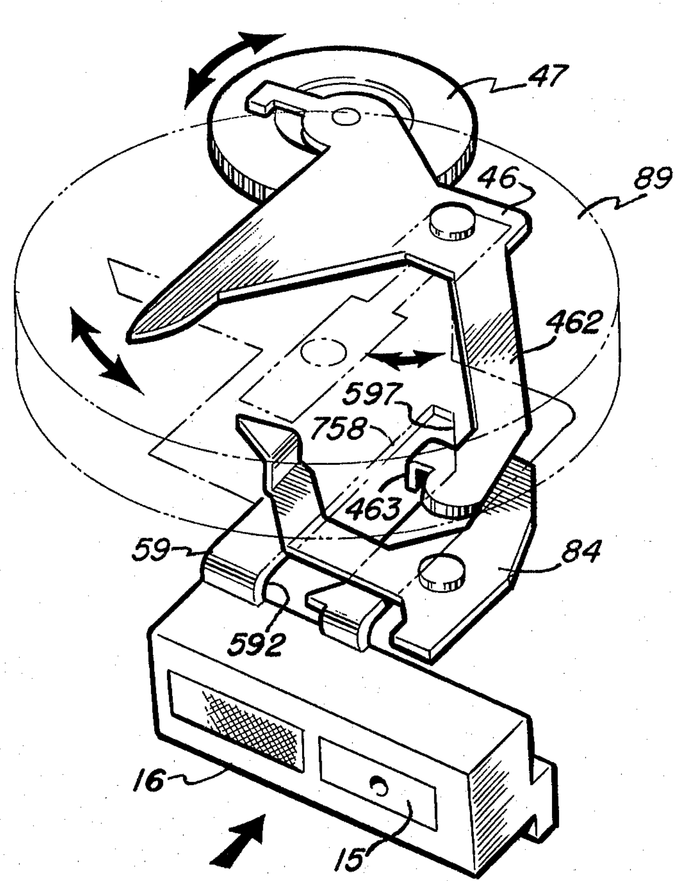

47
851
77
46
464
89
85
776
76
84
18

776
852
47
77
x
a
46
464
89
851
462
85
84
76
18

MAGNETIC REPRODUCING APPARATUS

BACKGROUND OF THE INVENTION

This invention relates to a magnetic reproducing apparatus for cassettes, and more particularly, a compact magnetic reproducing apparatus.

Nowadays, magnetic reproducing apparatus is required that is compact, light and capable of long recording and reproducing operations. Although compact magnetic reproducing apparatus of the microcassette type has been developed, it is still desirable to make such apparatus even more compact in size, simpler in construction, lighter in weight and more capable of easy operation. Furthermore, it is desirable for the apparatus to perform several useful functions as follows: (a) a CUE function for reproducing/fast forwarding/reproducing; (b) a REVIEW function for reproducing-/rewinding/reproducing; (c) a QUICK-REVIEW function for recording/rewinding/reproducing; and (d) an automatic stop operation function.

SUMMARY OF THE INVENTION

Accordingly, an object of the present invention is to provide a magnetic reproducing apparatus which is compact in size, simple in construction, light in weight and easy to operate.

Another object of the present invention is to provide a magnetic head carrying mechanism which makes a compact magnetic reproducing apparatus possible.

According to the present invention, an apparatus for magnetic recording and reproducing includes: (1) a main chassis; (2) a slider slidably supported on the chassis; (3) a reproducing button at one end of the slider; (4) a head lever positioned at approximately a right angle to the slider, the head lever having intermediate portions which are rotatably supported to the slider; (5) a magnetic head attached to one end of the lever; (6) a biasing element linking the other end of the lever to the slider or button; and (7) a regulation device positioned on the slider which maintains the lever at approximately a right angle to the slider.

The objects and advantages of the present invention will become apparent to persons skilled in the art from a study of the following description of the accompanying drawings.

BRIEF DESCRIPTION OF THE DRAWINGS

FIG. 9 is another plan view of part of the operating mechanism under the condition that a PLAY button is pressed.

FIG. 13 is a perspective view of a guide on the chassis which supports a recording slider which slides in the longitudinal direction.

FIG. 14(*a*) is a plan view of the guide.

FIG. 14(*b*) is a side view of the guide.

FIGS. 27(*a*) and (*b*) are plan views showing varied conditions of the lock release lever for automatic stop operation.

FIGS. 28(*a*) and (*b*) are perspective views showing varied conditions of part of the operating mechanism for automatic stop operation.

FIG. 31 is a perspective view showing the relation of the automatic stop operation lever and a switch of the stabilization circuit.

FIG. 32 is a perspective view of a printed electric wiring board with the switch attached.

DESCRIPTION OF THE PREFERRED EMMBODIMENT

Figure 1:
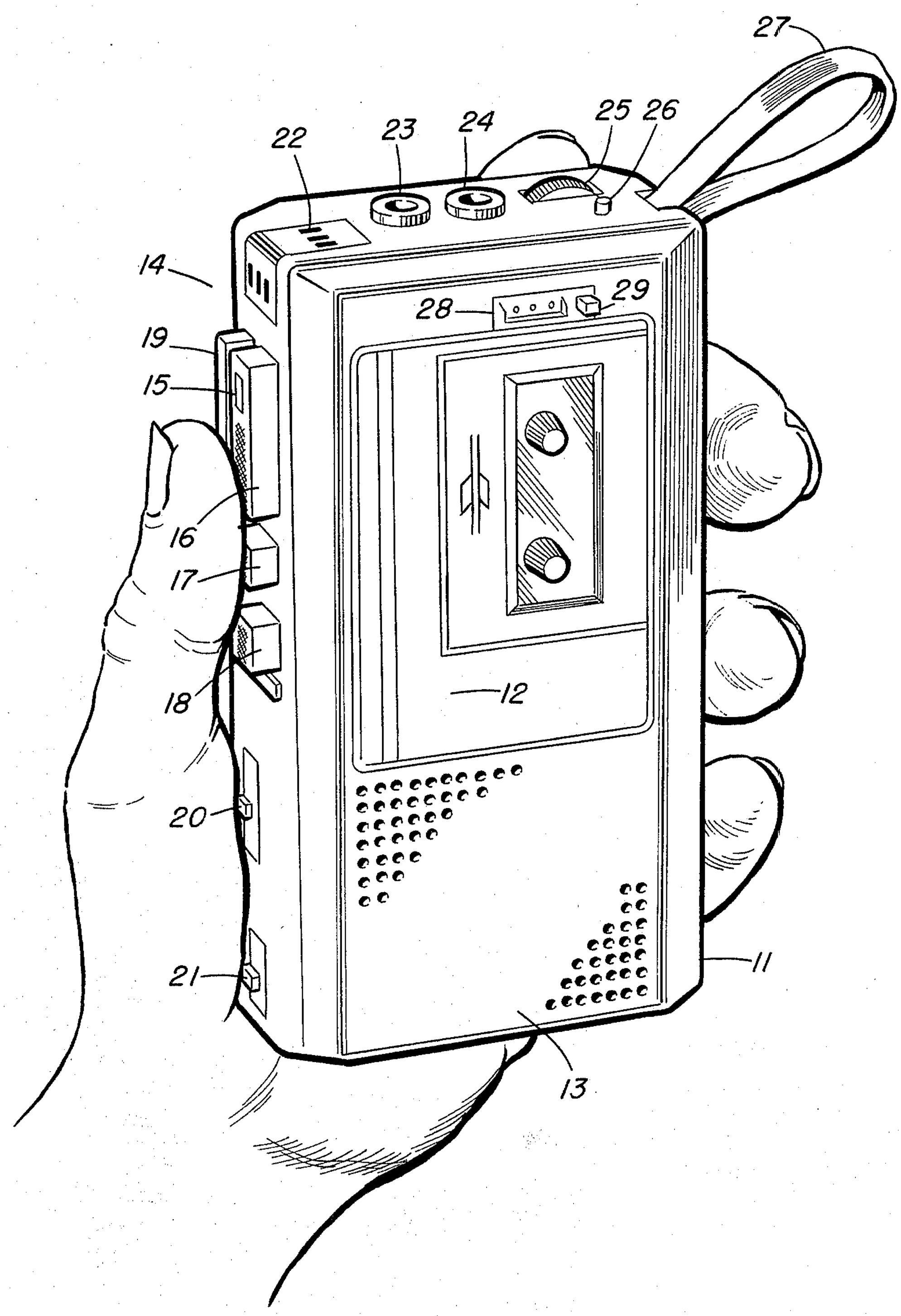
FIG. 1 is an external view of a magnetic reproducing apparatus according to the present invention.

An external view of a compact magnetic reproducing apparatus is shown in FIG. 1. This apparatus is compact and light in weight so that a user may hold it in one hand. The apparatus, speaking roughly, comprises a box-shaped cabinet 11, an operating mechanism 12, a loudspeaker section 13 and a control section 14. The control section 14 includes a REC button 15 for recording, a PLAY button 16 for reproducing, a FF button 17 for fast forwarding, a REW button 18 for rewinding, and a STOP-EJECT button 19 for stopping and ejecting. The control section 14 further includes a selecting switch 20 for changing the tape transporting speed during recording and reproducing conditions by either increasing or decreasing the speed by 10% of the normal speed. A selecting switch 21 is also provided for changing the tape transporting speed to either 1.2 cm/sec or 2.4 cm/sec during recording and reproducing conditions. The user can easily operate buttons 15 to 19 and switches 20–21 by only the thumb of his left hand. The control section 14 further includes a built-in microphone 22, a microphone jack 23, an earphone jack 24, a volume control dial 25, a PAUSE switch 26 for stopping tape transporting for a short time period, a carrying band 27, a tape counter 28 and a RESET button 29 for resetting the counter 28.

Figure 2:
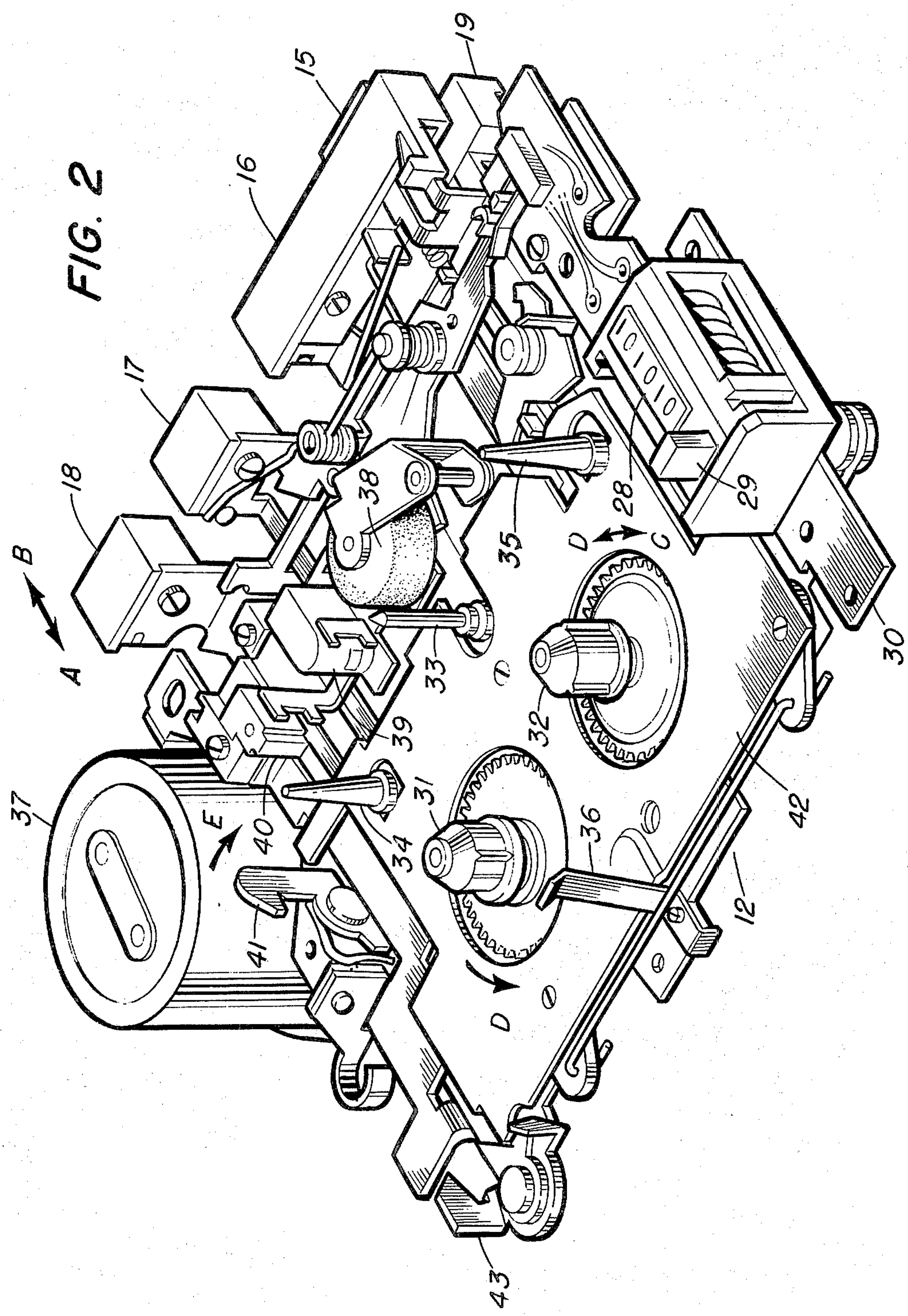
FIG. 2 is a perspective view of a manually responsive operating mechanism of the apparatus.

FIG. 2 is a perspective view of the operating mechanism 12 and control section 14. Left and right reel holders 31–32 are rotatably supported at a fixed space in the central portion of chassis 30. A rotatable capstan 33 protrudes at a point midway between the reel holders 31 and 32. Left and right guide pins 34–35 which hold a tape cassette, protrude at the left and right sides of capstan 33. A plate spring 36, which holds the tape cassette, is attached to chassis 30 at a point midway between reel holders 31 and 32 and opposite capstan 33. A motor 37 is attached at one corner of chassis 30.

Buttons 15 to 19 can be reciprocatively pressed in the directions of arrows A and B. When the PLAY button is pressed in the direction of arrow A, a pinch roller 38 contacts capstan 33. Furthermore, a magnetic head 39, which is located at the left side of pinch roller 38, slides in the same direction.

In the reproducing condition, holder 32 rotates in the direction of arrow C. When REC button 15 is pressed together with PLAY button 16 in the direction of arrows A, roller 38, head 39 and holder 32 are moved or rotated as mentioned above. Further, an erasure head 40, which is located at the left side of head 39, slides in the same direction dependent on the movement of head 39. As a result, operating mechanism 12 is in the recording condition.

When FF button 17 is pressed in the direction of arrow A, holder 32 rotates faster than in the reproducing condition. As a result, operating mechanism 12 operates in the fast forwarding condition. When REW button 18 is pressed in the direction of arrow A, reel holder 31 rotates very fast in the direction of arrow D. As a result, operating mechanism 12 is in the rewinding condition. Buttons 15 to 18, when pressed, are locked in position as mentioned later. When STOP-EJECT button 19 is pressed in the direction of arrow A, one or two of locked buttons 15 to 18 returns to its normal position in the direction of arrow B. When button 19 is pressed again, eject element 41, which is positioned in the neighborhood of motor 37, is moved in the direction of arrow E to open cover 10 (see FIG. 10) covering the tape cassette. Thus, operating mechanism 12 adopts a double ejection constitution. The tape cassette must be put in and taken out from the operating mechanism 12 by the user's hand.

In the event that FF button 17 or REW button 18 is pressed in the reproducing condition, it will not be locked. When button 17 or 18 is returned after it is pressed, operating mechanism 12 operates in the CUE or REVIEW condition. When REW button 18 is pressed in the recording condition, only REC button 15 is released from the locked position. In the latter event, while button 18 is pressed, operating mechanism 12 is in the rewinding condition. Then, when it is returned, operating mechanism 12 directly enters the reproducing state and begins to reproduce the recorded tracks of the tape. Such an operation is called QUICK-REVIEW. Further, operating mechanism 12 includes an automatic stop operation mechanism as mentioned later. Finally, operating mechanism 12 includes a blind plate 42 for supporting the tape cassette.

Figure 3:
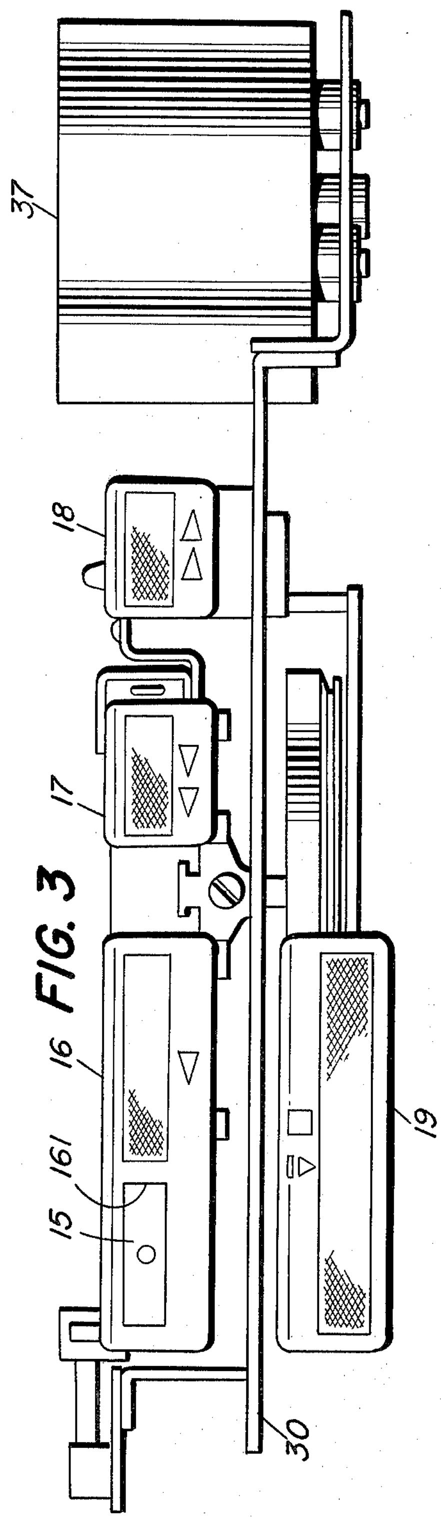
FIG. 3 is a side view of the operating mechanism.

As shown in FIG. 3, buttons 15 to 19 are arranged at the top and bottom of chassis 30. REC button 15 passes through a hole 161 in left portion of PLAY button 16. Accordingly, when the user presses the left portion of button 16, he can press button 15 at the same time.

The PLAY, FF and REW buttons 16 to 18 are arranged in a line at the top of chassis 30. The STOP-EJECT button 19 is positioned at the bottom of chassis 30 opposite button 16. Thus, the user can operate one or two of buttons 15 to 19 immmediately and correctly, in accordance with his wish.

The user is prevented from operating buttons 15 to 19 by mistake. If an accident occurs, such as the tape becomes entangled, the user is prevented from pushing FF or REW buttons 17–18. As described in further detail below, sliders move with buttons 15 to 19 and a lock plate is arranged at both sides of chassis 30. As a result, the operation efficiency increases and the construction of the magnetic recording apparatus is compact.

Figure 4:
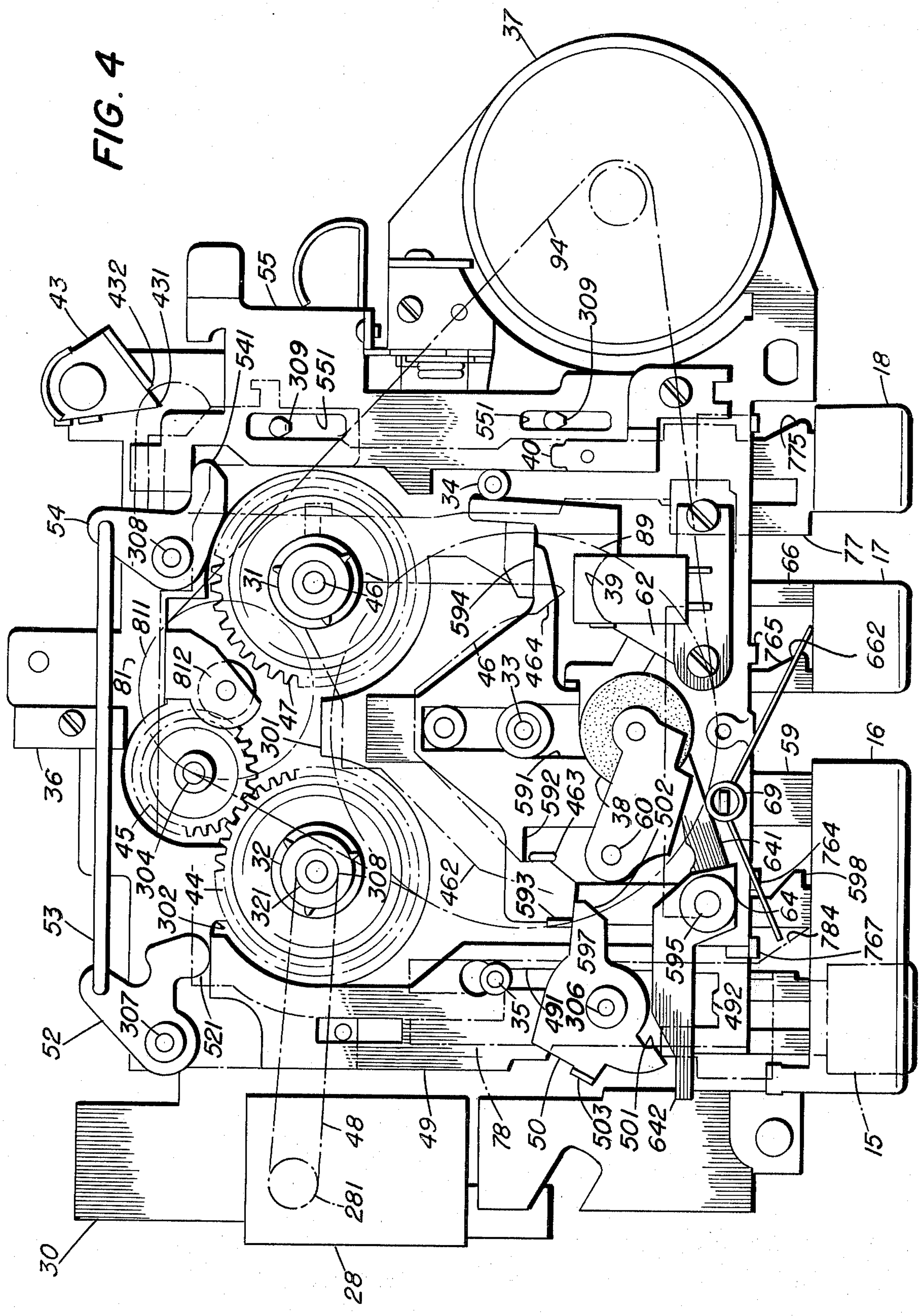
FIG. 4 is a plan view of the operating mechanism.
Figure 5:
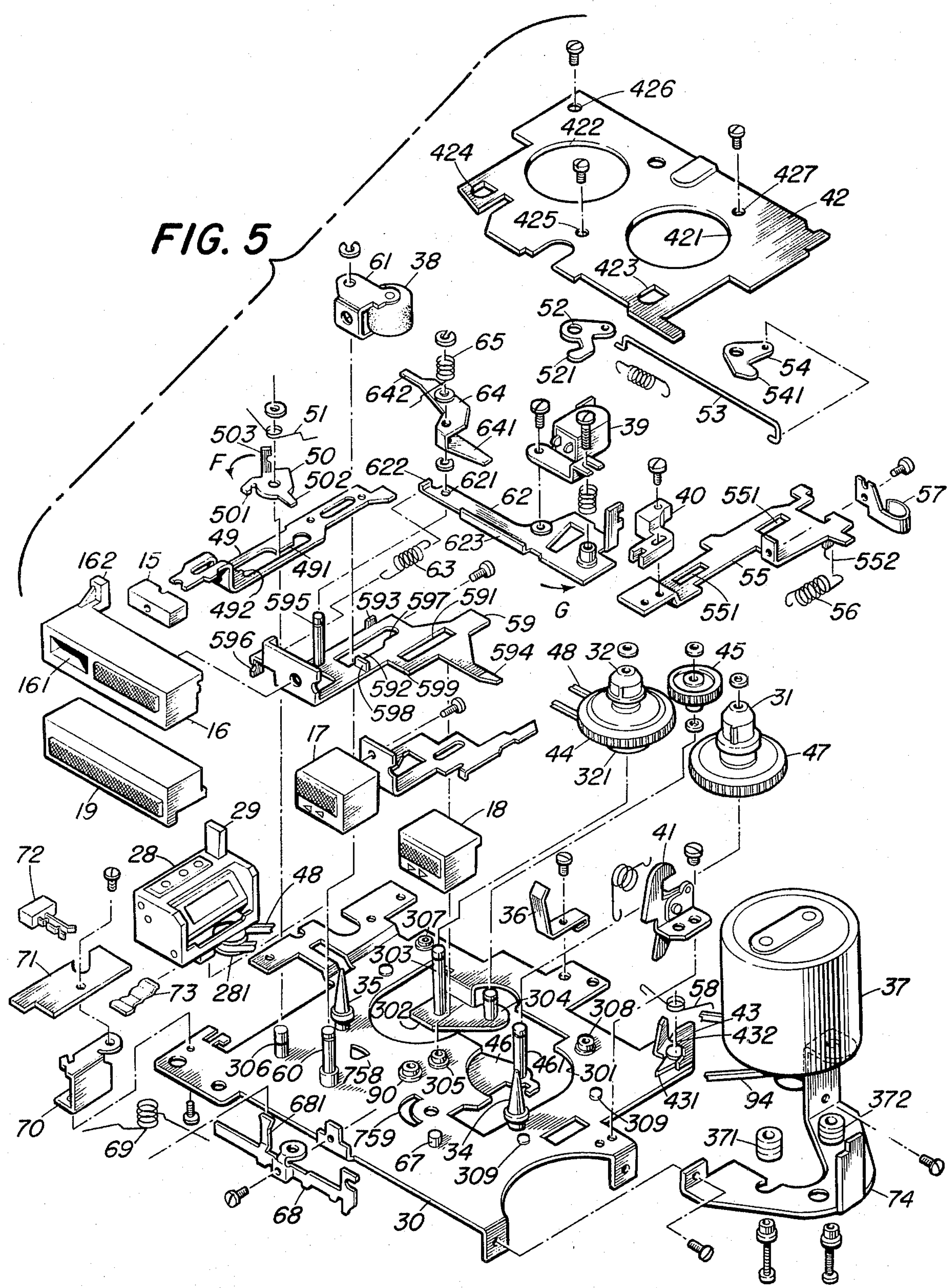
FIG. 5 is an exploded top side view explaining the part of the operating mechanism and the main chassis.
Figure 6:
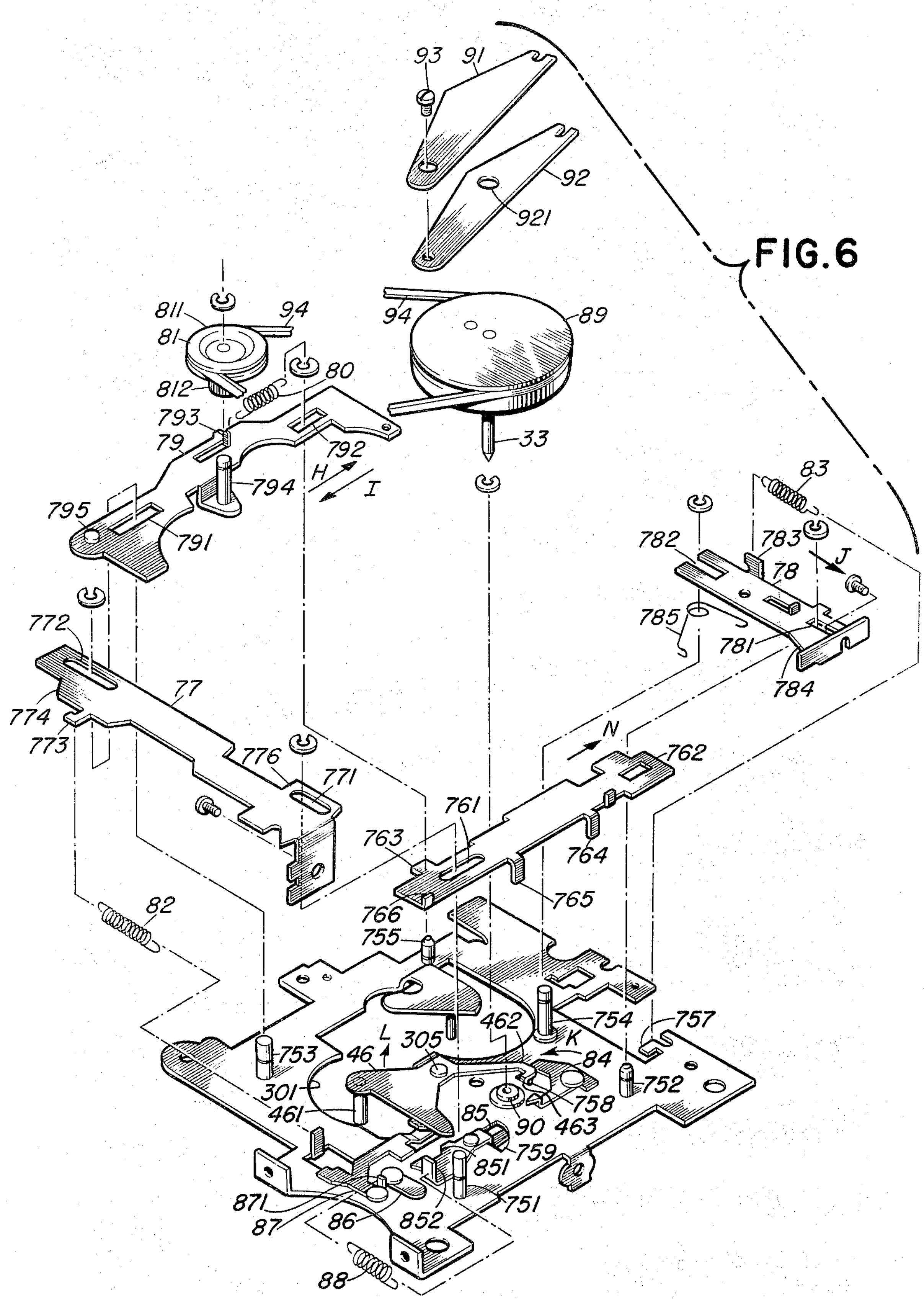
FIG. 6 is an exploded bottom view of the part of the operating mechanism and the chassis.

Next, FIGS. 4–6 show operating mechanism 12 in further detail. The chassis 30, which comprises is a square shaped plate has a penetration hole 301 in the center which has a shape like a pair of linked circles. A tongue 302 protrudes into the left portion of hole 301 and pins 303–304 are attached to tongue 302. The reel holder 32 is rotatably mounted on pin 303 and a gear 44 is positioned beneath holder 32 on the same axis. The holder 32 and gear 44 rotate together by the friction force between them; another gear 45, which meshes with gear 44, is rotatably mounted on pin 304.

An automatic stop operation (ASO) lever 46, which is supported beneath chassis 30 and rotatably mounted on pin 305, extends partially into hole 301. A pin 461 is attached to one end of ASO lever 46 and the holder 31 is rotatably mounted on pin 461. A gear 47 is positioned beneath reel holder 31 on the same axis. Accordingly, holder 31 moves in response to the turning of ASO lever 46. A pully 321 is positioned beneath gear 44 and this pulley rotates with holder 32. The rotation force of pulley 321 is transmitted to a pully 281, which drives tape counter 28 via a belt 48.

The REC button 15 is attached to one end of a recording (REC) operation slider 49. The slider 49 has a rectangular shaped penetration hole 491 in its intermediate portions which receives guide pin 35 and a pin 306 attached to the surface of the chassis. Accordingly, slider 49 is slidable in its longitudinal direction. A lock element 50, which is rotatably mounted on pin 306, is biased by a torsion spring 51 in the direction of arrow F. When a protrusion 501 of lock element 50 engages with a tab 492 of slide 49, the slider 49 is locked at its locked position.

The other end of the slider 49 contacts a protrusion 521 of transmission element 52, which is rotatably mounted on a pin 307 which is attached to chassis 30. The transmission element 52 is linked, via a transmission lever 53, with another transmission element 54, which is rotatably mounted on a pin 308 which is attached to chassis 30. Accordingly, elements 52, 54 move simultaneously in the same direction. A protrusion 541 of element 54 contacts one end of recording (REC) slider 55. Slider 55 has a pair of rectangular shaped holes 551, 551 on opposite ends. A pair of pins 309, 309, which are attached to chassis 30, pass through the holes 551, 551, respectively. Accordingly, slider 55 is slidable in its longitudinal direction. Slider 55 is biased by a coil spring 56 which is connected between tab 552 beneath one end portion of slider 55 and a tab (not shown) on chassis 30. Furthermore, erasure head 40 is mounted on the other end of slider 55. A line bundling element 57 is connected to head 39, which is attached to the intermediate portion of slider 55.

Referring to FIG. 4, the action of each part in response to pressing REC button 15 is now explained. When button 15 is pressed, slider 49 slides to turn element 52 in the counterclockwise direction. The lever 53 is thereby pulled to the left and element 54 turns in the counterclockwise direction. The slider 55 then slides up against the bias force of spring 56 so that head 40 contacts the tape.

An error erasure prevention element 43 is rotatably mounted on chassis 30 opposite one end of slider 55. The element 43 is biased by a torsion spring 58 in the clockwise direction as shown in FIG. 4. The tape cassette has an error erasure prevention nail on one edge. When the cassette is put into the operating mechanism, and the nail faces a tab 432 of element 43, the nail prevents element 43 from turning clockwise and opposing slider 55. Accordingly, slider 55 can slide and button 15 may not be operated. On the contrary, if the nail of the cassette is removed, element 43 is capable of turning in the clockwise direction. Accordingly, slider 55 cannot slide to thereby prevent the user from erasing by mistake.

The PLAY button 16 is attached to one end of a reproducing (PLAY) operation slider 59. Slider 59 has rectangular shaped holes 591, 592 in its intermediate portion. Pins 305 and 60, which are attached to chassis 30, pass through holes 591, 592 of slider 59, respectively. Accordingly, slider 55 slides in its longitudinal direction. A pinch lever 61 is rotatably mounted on pin 60 and pinch roller 38 is rotatably mounted on lever 61. Slider 59 also has a tab 593 and a protrusion 594 on both sides. The lock element 50 is turned by spring 51 in the direction of arrow F in FIG. 5, until protrusion 502 of element 50 contacts tab 593 of slider 59. The protrusion 594 engages one end portion of an ejecting lever which is described in greater detail below.

A pin 595, which is attached to slider 59, passes through a hole 621 intermediate head slider 62. The head slider 62 crosses slider 59 at a substantially direct angle. The slider 62 is rotatably mounted on pin 595. The head slider 62 is biased in the direction of arrow G in FIG. 5 by a coil spring 63 which links a tab 622 on one end of the slider 62 to a tab 596 on one end of slider 59. The pin 595 of slider 59 also supports a rotatable transmission lever 64. The arm 641 of slider 64 opposes tab 623 on one side of slider 62. The other arm 642 of slider 64 engages tab 503 of lock element 50. The pin 595 also supports a torsion spring 65 which is positioned so that one end engages PLAY button 16 and the other end engages pinch lever 61. Accordingly, pinch lever 61 is biased by spring 61 in the direction of capstan 33 (see FIG. 2). Head 39 is attached to the other side of head slider 62 via a conventional azimuth adjustment mechanism.

An FF button 17 is attached to one end of a fast forwarding (FF) slider 66. Slider 66 has a rectangular shaped hole 661 in its intermediate portion. A pin 305 on the surface of chassis 30 passes through hole 661 of slider 66. Accordingly, slider 66 is supported by pin 305 of chassis 30 so that it slides in its longitudinal direction.

A supporting plate 68 presses sliders 59, 66 down on chassis 30. The plate 68 has a protrusion 681 which supports a torsion spring 69. One end of spring 69 contacts PLAY button 16 and the other end contacts FF button 17. The buttons 16, 17 are biased by spring 69 in the return direction.

A printed wiring plate 71 is attached to one corner of chassis 30 via an attachment 70. A switch 72 for driving motor 37 is connected to plate 71. The tape counter 28 is attached to the side of chassis 30 by a wave shaped plate spring 73. The motor 37 is attached to chassis 30 by an attachment 74 which is attached to motor 37 by bushings 371, 372.

As shown in FIG. 6, a pair of pins 751–752 are attached to the rear of chassis 30 and in the neighborhood of buttons 15 to 17. The pins 751, 752 pass through rectangular shaped penetration holes 761, 762 in the ends of a lock plate 76. The lock plate 76 is supported by pins 751, 752 for sliding in the longitudinal direction. The pin 751 also passes through a rectangular shaped hole 771 of a rewinding (REW) operation slider 77, which crosses lock plate 76 at approximately a right angle. The pin 752 passes through a rectangular shaped hole 781 of a lock operation slider 78, which crosses lock plate 76 at approximately a right angle. Slider 77 has a rectangular shaped hole 772 for receiving a pin 753 which is attached to the rear of chassis 30. Accordingly, slider 77 is supported by pins 751, 753 of chassis 30. Slider 78 has a rectangular shaped notch 782 for receiving a pin 754 which is attached to the rear of chassis 30. Accordingly, slider 78 is supported by pins 752, 754 of chassis 30. The REW button 18 is attached to the end of slider 77 and the STOP-EJECT button 19 is attached to the end of the slider 78.

The pin 753 passes through a rectangular hole 791 of one end of a rewinding (REW) slider 79. The REW slider 79 is positioned between chassis 30 and slider 77, and crosses slider 77 at approximately a right angle. The pin 755 beneath chassis 30 passes through a rectangular shaped hole 792 at the other end of slider 79. Accordingly, slider 79 is supported by pins 753, 755 of chassis 30. The slider 79 has a tab 793 which is linked to pin 755 of chassis 30 via a coil spring 80. Accordingly, slider 79 is biased by spring 80 in the direction of arrow H. A pin 794 is attached to the intermediate portion of slider 79. A gear pulley, which comprises a pulley 811 and a gear 812, is rotatably mounted by pin 794. The gear 812 lies between gears 45 and 47 in FIG. 5 and it engages gear 45 when slider 79 slides via the bias force of spring 80 in the direction of arrow H. On the contrary, gear 812 engages gear 47 when slider 79 slides against the bias force of spring 80 in the direction of arrow I.

A protrusion 773 at the side of slider 77 is linked to a tab 756 at the side of chassis 30 via a coil spring 82. Accordingly, slider 77 is biased by spring 82 in its return direction. Slider 77 has a slope 774 in its side portions which engages pin 795 at one end of slider 79. A tab 783 at one side of slider 78 is linked to an L-shaped protrusion 757 at the corner of chassis 30 via a coil spring 83. Accordingly, slider 78 is biased by spring 83 in the direction of arrow J.

The ASO lever 46 has an extension 462 having a tab 463 formed at its end. Tab 463 passes through a triangular hole 758 of chassis 30 and engages slope 597 of slider 59 which protrudes into hole 592 (see FIG. 4). The end of extension 462 also contacts the end of an L-shaped lock release lever 84 which is rotatably mounted on chassis 30. Lever 84 is biased by a torsion spring 785, which is supported by pin 754 of chassis 30 in the direction of arrow K. Accordingly, ASO lever 46 is biased in the direction of arrow L in response to the lever 84.

The ASO lever 46 has a protrusion 464 which contacts a step 851 of a linking lever 85, which is rotatably mounted on the rear of chassis 30. The protrusion 464 is released from step 851 in response to the turning of lever 85. One end of lever 85 passes through chassis 30, and engages pinch lever 61 and transmission lever 64 above chassis 30. The other end of lever 85 opposes one end of an eject lever 87 which engages protrusion 594 of slider 59 (see FIG. 5). The EJECT lever 87 has an L-shaped form which is rotatably mounted to a driving lever 86. The EJECT lever 87 engages one end of an EJECT element 41 (see FIG. 5) to turn the element 41 in the direction of arrow E (see FIG. 2). The driving lever 86 is L-shaped and is rotatably mounted on chassis 30. The lever 86 engages protrusion 763 on one side of lock plate 76. A tab 871 at the corner of eject lever 87 is linked to pin 751 of chassis 30 via a coil spring 88. Accordingly, lever 86 is biased in the direction of arrow M in response to the bias of the lever 87. The lock plate 76 also is biased in the direction of arrow N in response to the bias of lever 86.

The sliders 59, 66 and 77 have conventional locking elements 598, 662 and 775, respectively (see FIG. 4). When each slider 59, 66, 77 is pressed, each locking element 598, 662, 775 engages each tab 764, 765, 766 on the side of lock plate 76. Accordingly, each slider 59, 66, 77 is locked at the operation position. A sloping element 784 of slider 78 engages tab 767 of lock plate 76 when slider 78 is operated in the direction opposite to the direction of arrow J. Accordingly, lock plate 76 slides in the opposte direction of arrow N. Each slider 59, 66, 77 is released from its locked position in response to the slide of lock plate 76 in the opposite direction of arrow N.

A flywheel 89 is rotatably mounted on chassis 30. One end of rotation axis 33 of flywheel 89 passes through a aperture 90 in the center of chassis 30 to form capstan 33 on chassis 30. The other end of rotation axis 33 is received by a receiving plate 921 at the center of a support plate 92. A plate 91 located beneath support plate 92. One end of plates 91, 92 is held by pin 754 of chassis 30. The other end of these plates is fixed to pin 751 of chassis 30 by a screw 93. The rotation force of motor 37 is transmitted to flywheel 89 and gear pulley 81 by a belt 94.

Figure 7:
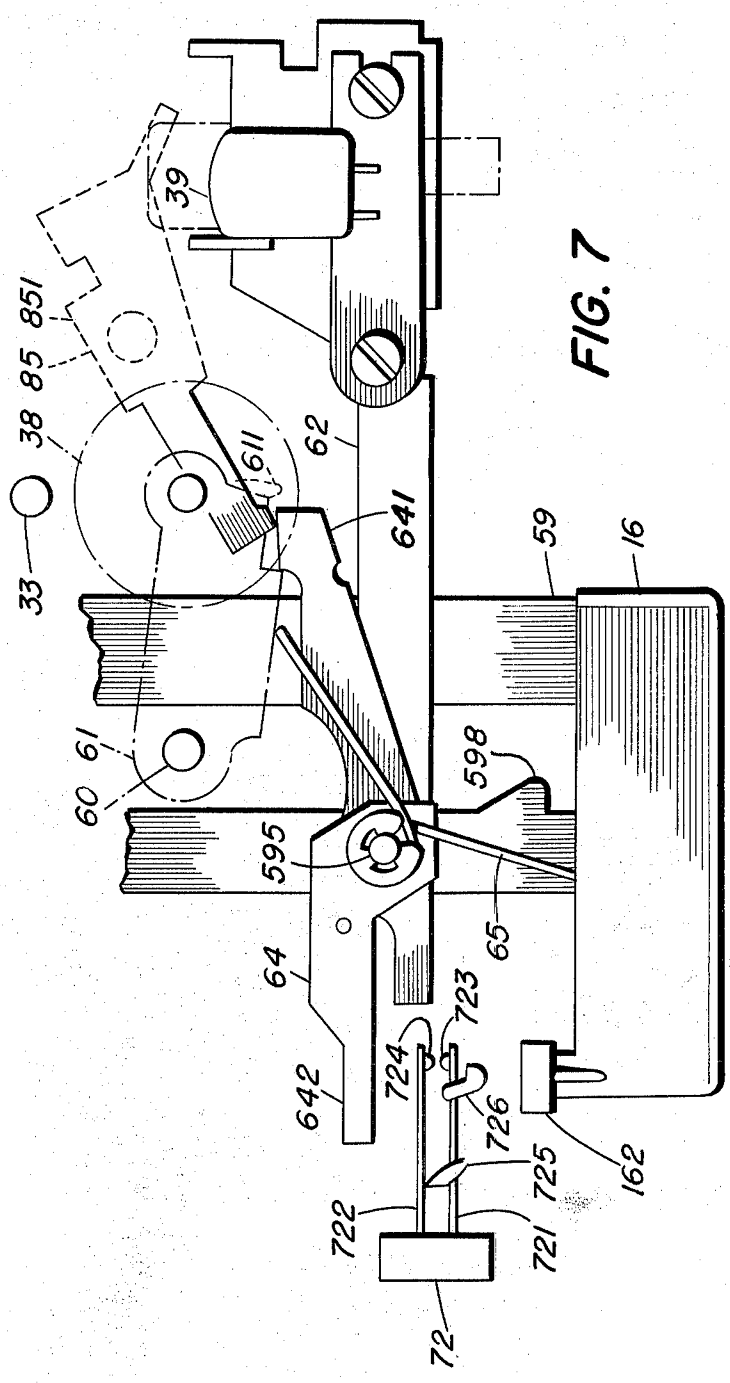
FIG. 7 is a plan view of part of the operating mechanism.

FIG. 7 is a plan view of part of the operating mechanism. The PLAY button 16 has a protrusion 162 which opposes a spring plate 721 of switch 72. Switch 72 has a spring plate 722 in parallel with plate 721. A pair of opposite electrodes 723, 724 are attached to the ends of spring plates 721, 722, respectively. A spacer 725 is attached to the center of plate 721 to maintain the space between plates 721, 722. A buffer piece 726 is attached to the end of plate 721 to prevent electrodes 723 and 724 from being pressed too hard.

The pinch lever 61 is biased by torsion spring 65 in the counterclockwise direction around pin 60. The pinch lever 61 turns till a tab 611 at one end contacts a step 599 of slider 59 (see FIG. 5). Accordingly, pinch roller 38 does not contact capstan 33. The end of link lever 85 which protrudes above chassis 30 engages tab 611 of pinch lever 61 and arm 641 of transmission lever 64.

Figure 8:
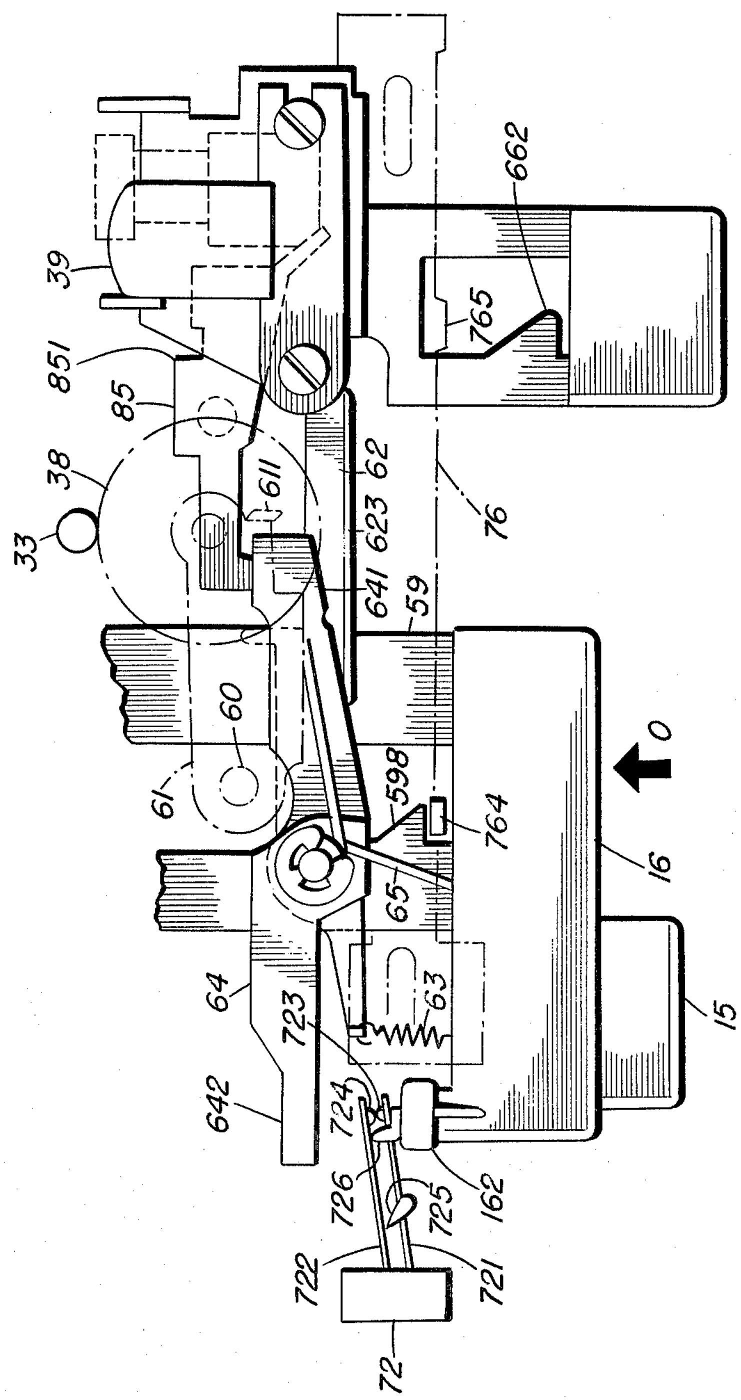
FIG. 8 is a plan view of part of the operating mechanism under the condition that a PLAY button is pressed.

Assuming PLAY button 16 is pressed in the direction of arrow O, as shown in FIG. 8, PLAY operation slider 59 slides in the direction of arrow O. Head lever 62 and transmission lever 64, which are supported by pin 595 of slider 59, also slide in the direction of arrow O. At this time, head lever 62 is biased by coil spring 63 in the counterclockwise direction around pin 595. However, the turning of head lever 62 in the counterclockwise direction continues until it contacts tab 598 (see FIG. 5), which is attached to the intermediate portion of slider 59. As a result, head lever 59 is moved substantially in parallel to lever 62. The head 39 installed on lever 62 is moved in the direction of arrow O and contacts the tape of the cassette.

The step 599 of slider 59 is then released from the tab 611 of pinch lever 61. At this time, pinch lever 61 is turned by the bias force of torsion spring 65 in the counterclockwise direction. As a result, pinch roller 61 contacts capstan 33 via the tape. Slider 59 is locked at the operation position since its locking element 598 engages tab 764 of lock plate 76. At this time, protrusion 162 presses buffer piece 726 of spring plate 72. Accordingly, electrodes 723, 724 of spring plate 721, 722 contact each other. A stabilized DC voltage is supplied from a voltage stabilization circuit, which is described below, to motor 37. The gear pulley 81 and flywheel 89 are rotated by motor 37 in the clockwise direction. The gear 44 of reel holder 32 engages the gear 45 and the gear 45 engages gear 812 of gear pulley 81. Accordingly, holder 32 is rotated in the clockwise direction to transport the tape.

In conventional magnetic reproducing apparatus, a head chassis is linked to the PLAY slider via a coil spring or other such part, and is moved in response to the movement of the slider. Accordingly, conventional apparatus uses a larger number of parts and is more costly and complicated. Also, if the size of each part is small, the linkage between parts becomes unreliable, and errors occur. On the contrary, in the apparatus of this invention, the head lever 62 is linked directly to PLAY operation slider 59 by pin 595. Accordingly, the apparatus not only decreases the number of parts but improves the reliability of the linkage between lever 62 and slider 59. The apparatus also is more compact and lighter in weight.

As mentioned above, switch 72 for actuating motor 37 is positioned near PLAY button 16, and may be turned on or off by operating button 16. Accordingly, the space for installing the switch 72 is minimal and additional means for operating switch 72 is unnecessary. As a result, the compactness of the apparatus is facilitated, and the operation of only switch 72 becomes unnecessary.

As shown in FIG. 9, in the reproducing condition, the slider 59 slides in the direction of arrow O and tab 593 of slider 59 is released from protrusion 502 of locking element 50. Accordingly, locking element 50 is turned in the counterclockwise direction by the bias force of torsion spring 51 (see FIG. 5). At this time, the locking element 50 turns until protrusion 501 opposes tab 492 of REC operation slider 49. Accordingly, the user cannot operate REC button 15 since protrusion 501 of locking element 50 prevents slider 49 from sliding.

Figure 10:
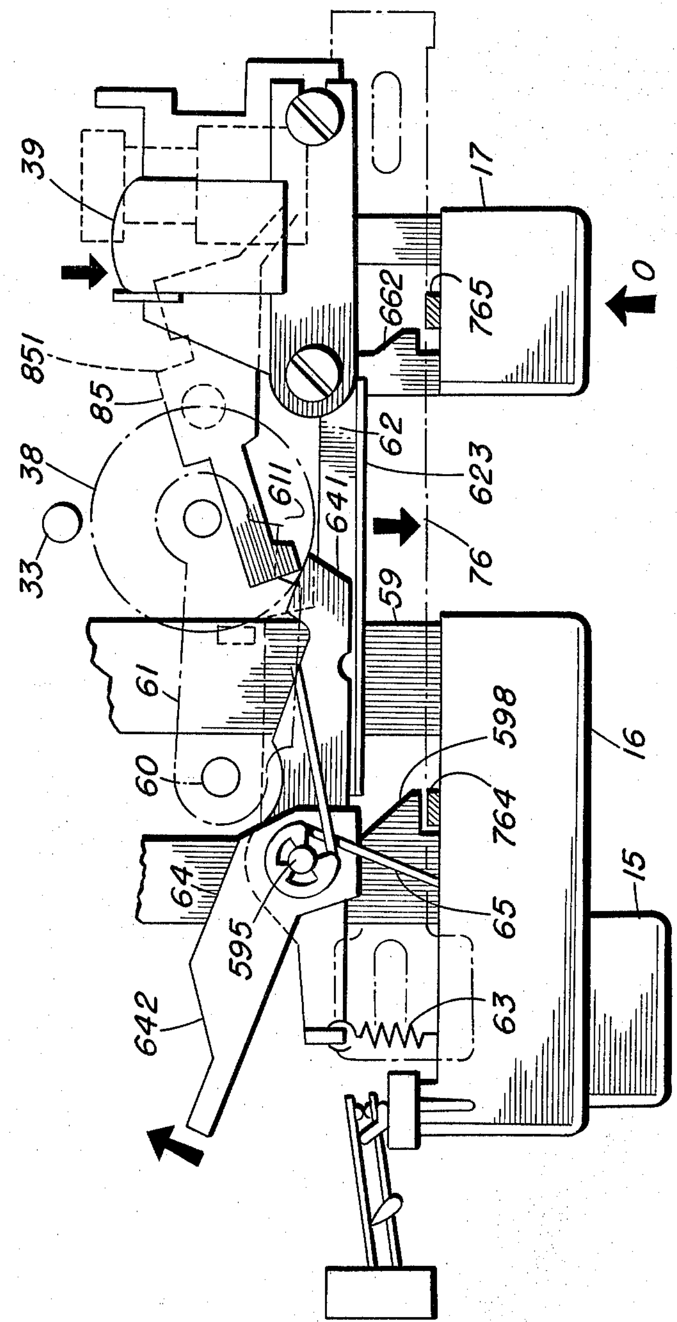
FIG. 10 is a plan view of part of the operating mechanism under the condition that a FF button is pressed in the reproducing operation condition.

As shown in FIG. 10, in the reproducing condition, assume FF button 17 is pressed in the direction of arrow O. The tab 663 of FF operation slider 66 (see FIG. 5) contacts the other end of linking lever 85, and turns lever 85 in the counterclockwise direction. The tab 611 of pinch lever 61 and arm 641 of transmission lever 64 are pressed by lever 85, and are turned slightly in the clockwise direction. The pinch roller 38 is released from capstan 33. Also, tab 623 of head lever 62 is pressed by arm 641 of lever 64, and is turned slightly in the clockwise direction against the bias force of spring 63. As a result, head lever 62 is moved back to the position where head 39 lightly contacts the tape. At this time, operating mechanism 12 moves from the reproducing condition to the fast forwarding condition, that is, to the CUE condition.

While locking element 598 of slider 59 engages tab 764 of lock plate 76, the lock element 662 of slider 66 is formed such that it does not engage tab 765 of plate 76. Accordingly, operating mechanism 12 is maintained in the CUE condition only the FF button 17 is pressed.

Next, assume REW button 18 is pressed in the reproducing condition. At this time, step 776 of the REW operation slider 77 (see FIG. 6) contacts tab 852 of linking lever 85. Accordingly, lever 85 is turned in the clockwise direction as mentioned below in reference to FIG. 21. In accordance with the program as well as in the CUE condition, pinch roller 38 and head 39 are moved back slightly. At this time, operating mechanism 12 moves from the reproducing condition to the rewinding condition, that is, to the REVIEW condition. Likewise, slider 77 is formed such that it is not locked by lock plate 76 while operating mechanism 12 is in the REVIEW condition.

Now, assume both REC and PLAY buttons 15 and 16 are pressed simultaneously. The pinch roller 38, head 39, etc. are moved to the position mentioned above in the reproducing condition, and remain there. At this time, tab 492 of REC operation slider 49 engages protrusion 501 of lock element 50. Accordingly, slider 49 is locked by element 50 at operation position. Further, as mentioned above in relation to FIG. 4, erasure head 40 advances to contact the tape.

Now, assume REW button 18 is pressed in the recording operation condition. As shown in FIG. 10, linking lever 85 is turned in the counterclockwise direction, and transmission lever 64 is turned in the clockwise direction. At this time, other arm 642 contacts tab 503 of lock element 50 (see FIG. 5). Accordingly, element 50 is turned by lever 64 in the clockwise direction. Then, protrusion 501 of lock element 501 is released from tab 492 of REC operation slider 49. Accordingly, slider 49 is released from lock element 50. During depression of button 18, operating mechanism 12 is maintained in the rewinding condition. When REW button 18 is returned, PLAY button 16 remains in its locked position. Therefore, operating mechanism 12 directly enters the reproducing condition and the so-called QUICK-REVIEW operation is completed.

Figure 11:
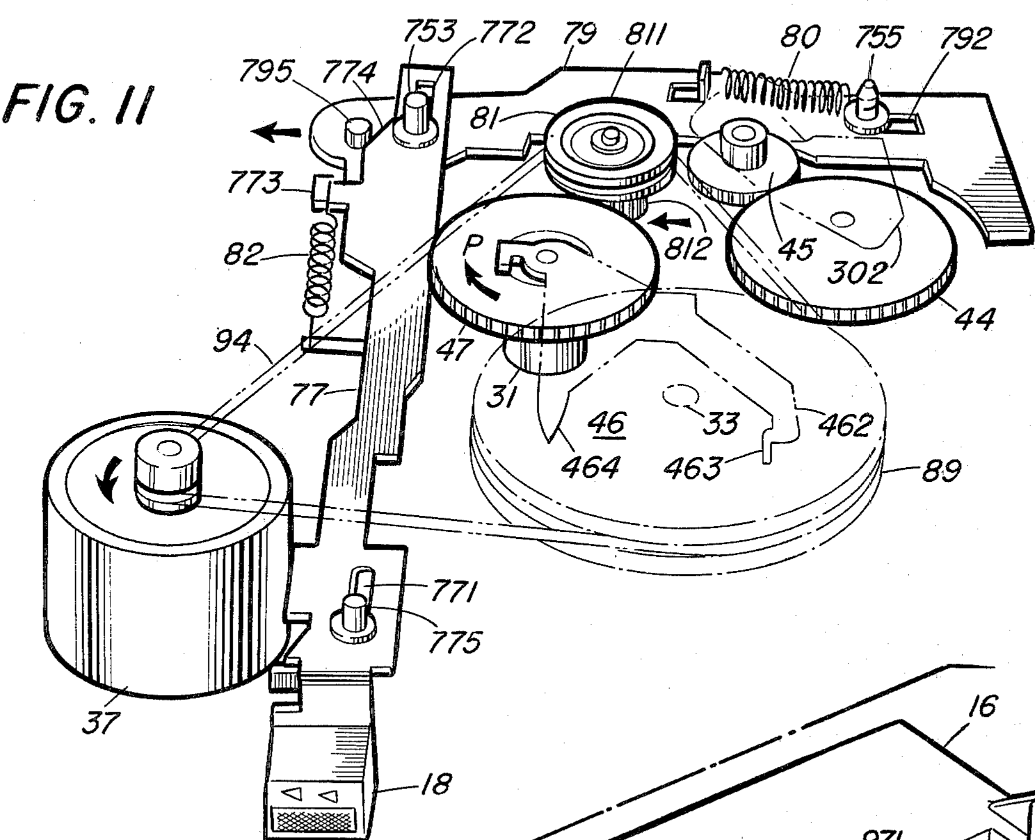
FIG. 11 is a perspective view of part of the operating mechanism under the condition that a REW button is pressed.

Now, assume only REW button 18 is pressed. As shown in FIG. 11, REW operation slider 77 slides up in response to pressing button 18. At this time, slope 774 of slider 77 thrusts aside pin 795 of REW slider 79. Accordingly, slider 79 slides to the left and gear 812 of gear pulley 81 is released from gear 45 to engage gear 47. The gear 47 and reel holder 31 then are rotated in the direction of arrow P to complete the rewinding operation. At that time, a switch, which is further described below, is turned on in response to the movement of slider 77. The switch supplies motor 37 with DC voltage to rewind the tape at a fast speed.

Figure 12A:
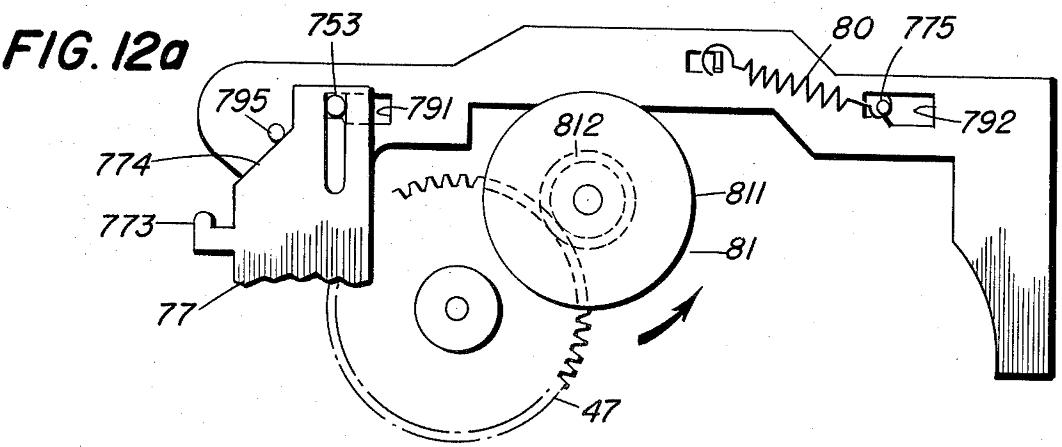
FIGS. 12(*a*) and (*b*) are plan views of part of the operating mechanism before and after the REW button is pressed.
Figure 12B:
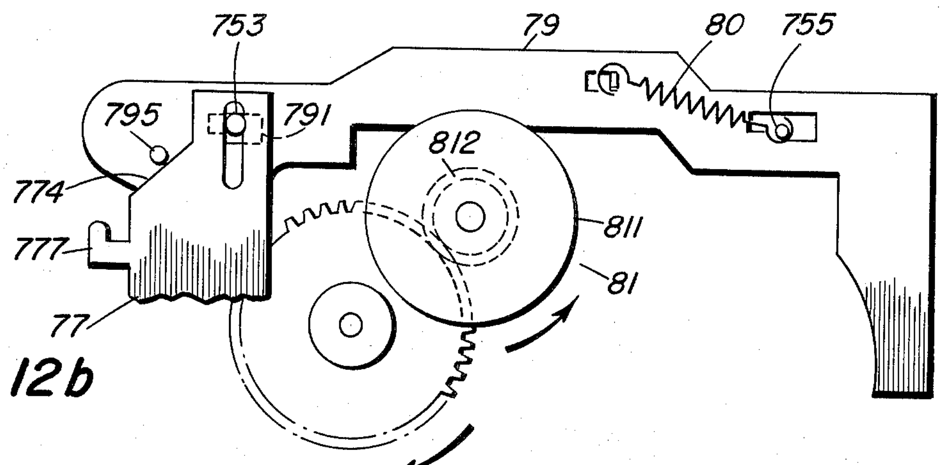

Next, FIGS. 12(*a*) and (*b*) are views for explaining the condition of part of the operating mechanism 12 before and after REW slider 79 slides. As shown in FIG. 12(*a*), slider 79 can slide to the left and right; pins 753 and 755 of chassis 30 pass through holes 791 and 792 of slider 79, respectively. The holes 791–792 are rectangular, with the left end narrower than right end. In the normal state, slider 79 is biased to the right by spring 80, and pins 753, 755 are positioned in the left end of holes 791, 792, respectively. When slider 77 slides up, pin 795 of slider 79 is thrust along the slope 774 of slider 77, as shown in FIG. 12(*b*). Accordingly, slider 79 slides to the left and, simultaneously, turns slightly in the counterclockwise direction against the bias force of spring 80. The pins 753, 755 of chassis 30 are positioned at the right holes 791 and 792, respectively. At this time, the gear pulley 81 engages gear 47 to reliably perform the rewinding operation.

Since gear 812 of gear pulley 81 engages gear 44 of reel holder 32 in the normal state, operating mechanism 12 directly enters forwarding condition when FF button 17 is pressed. Likewise in the forwarding condition, the switch mentioned above is turned on in response to movement of FF operation slider 66. For that, the DC voltage, which is still not stabilized by the stabilization circuit, is applied to motor 37. As a result, the forwarding operation is performed.

Now, referring to FIGS. 13 and 14(*a*) and (*b*), a pair of guide elements 309 of chassis 30 are shown which support REC slider 55 (see FIG. 5). Each guide element 309 is fabricated so one portion of chassis 30 has a tongue shape. Each guide element 309 has a substantially half circle shape; the width $l_1$ of its base is narrower than the width $l_2$ of its center, and its center 952 is in parallel with chassis 30. Each guide element 309 passes through each hole 551 of REC slider 55 (see FIG. 5) to support slider 55 in the longitudinal direction. Accordingly, guide pins or the like for supporting slider 55 are unnecessary and the number of parts may be reduced. Further, the elements 309 may be fabricated while chassis 30 is produced.

Figure 15:
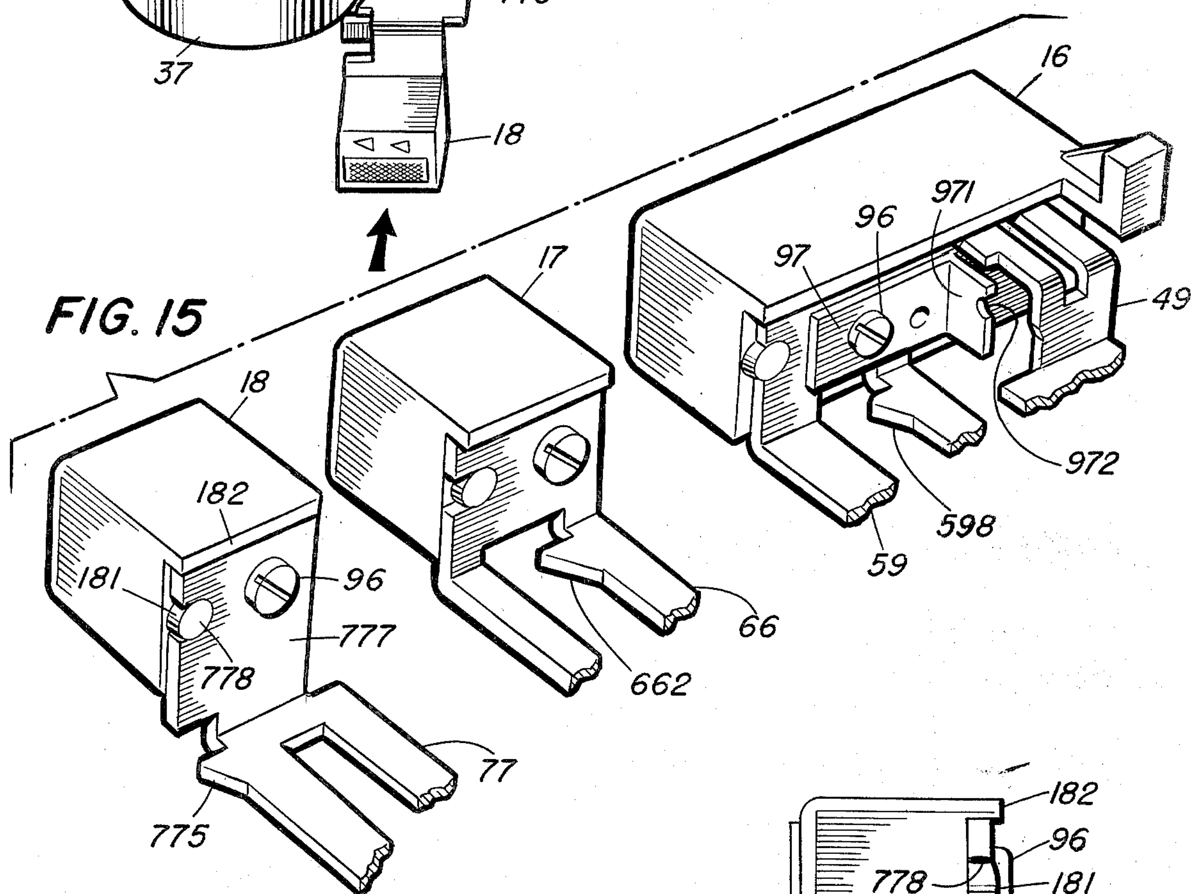
FIG. 15 is a perspective view of the operation buttons and a portion of their sliders.
Figure 16:
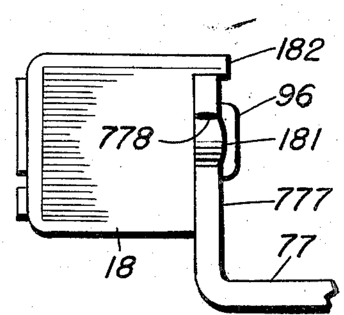
FIG. 16 is a side view of the REW button and an end portion of a rewinding operation slider.

Next, referring to FIGS. 15 and 16, the attachment of REW button 18 to REW operation slider 77 is now described. Since the other buttons 16, 17 are attached to their sliders in the same manner, an explanation of button 18 only is given. As shown, one end of slider 77 has an L-shaped tab 777. The tab 777 has a notch 778 on one side. It also has an aperture (not shown) in its other side for receiving a screw 96 for attaching slider 77 to button 18. The button 18 has a visor shaped protrusion 182 in its rear end top portion. The top of tab 777 contacts protrusion 182, and then slider 77 slides along protrusion 182. Protrusion 181 on the rear of button 18 passes through notch 778 of tab 777. The tab 777 is reliably fixed to button 18 by screw 96. Thus, only one screw is necessary and attachment can be easily accomplished. The slider 77 will not rattle up and down or in the left and right direction.

The slider 59 is attached to button 16 in almost the same manner as mentioned above. However, an L-shaped plate 97 and the rear of button 16 are screwed together via the bent end of slider 59, which is placed between plate 97 and button 16. A tab 971 of plate 97 has a notch 972. One end of torsion spring 69 (see FIG. 5) engages notch 972 of plate 97 and biases button 16 in its return direction.

Figure 17:
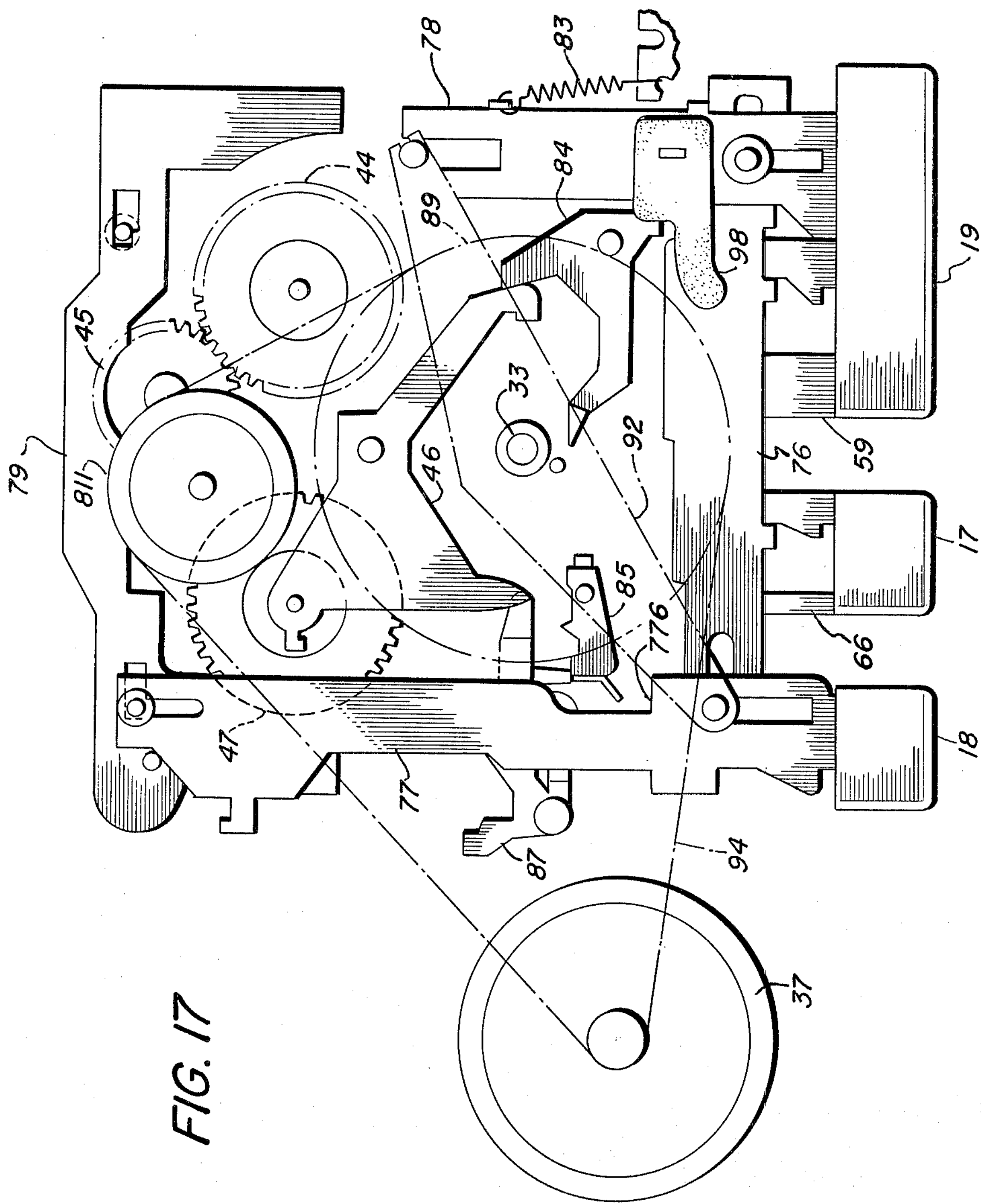
FIG. 17 is a rear view of the operating mechanism.
Figure 18:
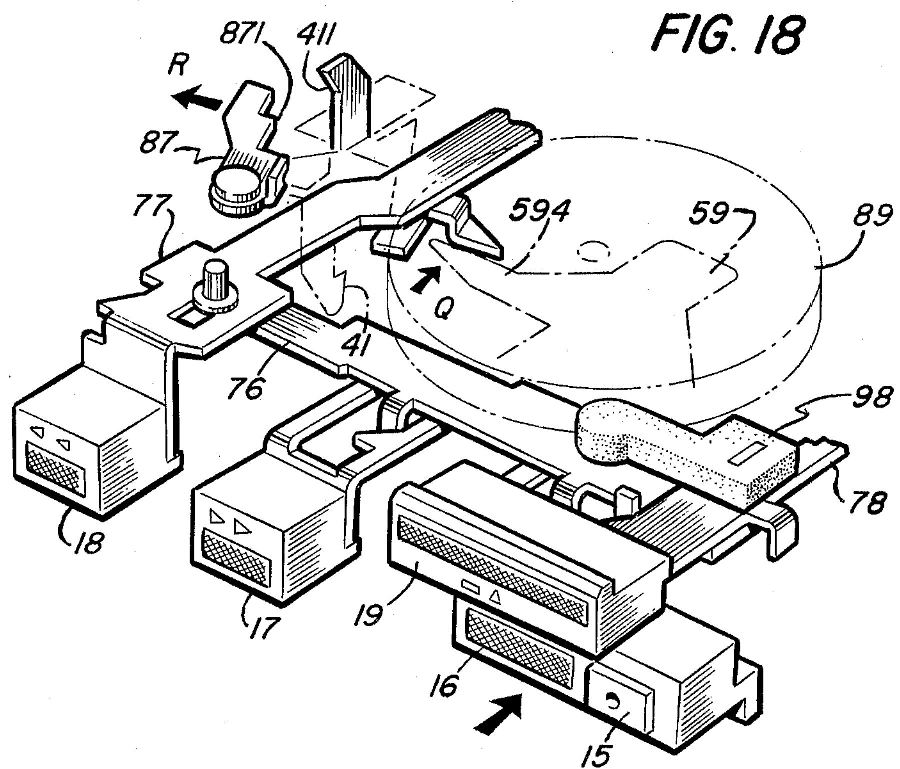
FIG. 18 is a perspective view of part of the operating mechanism for explaining the reproducing operation.

Now, referring to FIGS. 17–21, the braking and ejection action of operating mechanism 12 are explained. As shown in FIG. 17, a brake member 98, which, until now, has been omitted from the drawings for the sake of explanation, is attached to the rear of STOP-EJECT operation slider 78. As shown in FIG. 18, end of brake member 98 does not contact flywheel 89 while, for example, PLAY button 16 is operated and slider 78 is not. The flywheel 89 rotates to transport the tape at normal speed. At this time, PLAY operation slider 59 moves in the direction of arrow Q in response to the operation button 16. The ejection lever 87, one end of which contacts protrusion 594 of slider 59, is turned in the direction of arrow R. Step 871 at the other end of lever 87 is moved so it does not engage tab 411 of ejection element 41, which projects below chassis 30.

Figure 19:
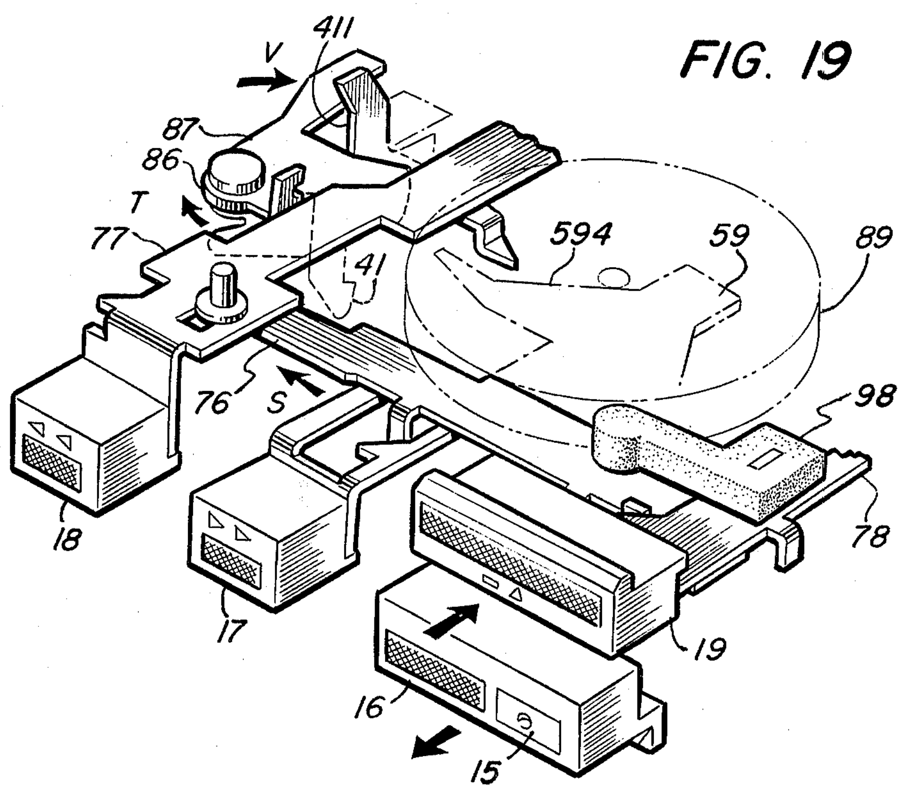
FIG. 19 is a perspective view of part of the operating mechanism for explaining the stop operation for the reproducing condition.

In the reproducing condition, assume button 19 is pressed, as shown in FIG. 19. Since lock plate 76 moves in the direction of arrow S in response to slider 78, button 16 releases from the lock via plate 76 and returns. At this time, brake member 98 brakes flywheel 89. Accordingly, the rotation of flywheel 89 stops. When plate 76 moves in the direction of arrow S, its protrusion 763 (see FIG. 6) turns driving lever 86 in the direction of arrow T. In this case, the ejection lever 87 is pressed slightly in the direction of arrow U, without engaging tab 411 of ejection member 41, after it is turned in the direction of arrow V. At this time, since slider 59 returns, its protrusion 594 is off the end of lever 87. Since button 19 is no longer pressed, slider 78 returns by the bias force of spring 83 (see FIG. 6) in the opposite direction of arrow S. Also, lever 87 returns in the opposite direction of arrow U due to the bias force of spring 88 (see FIG. 6).

Figure 20:
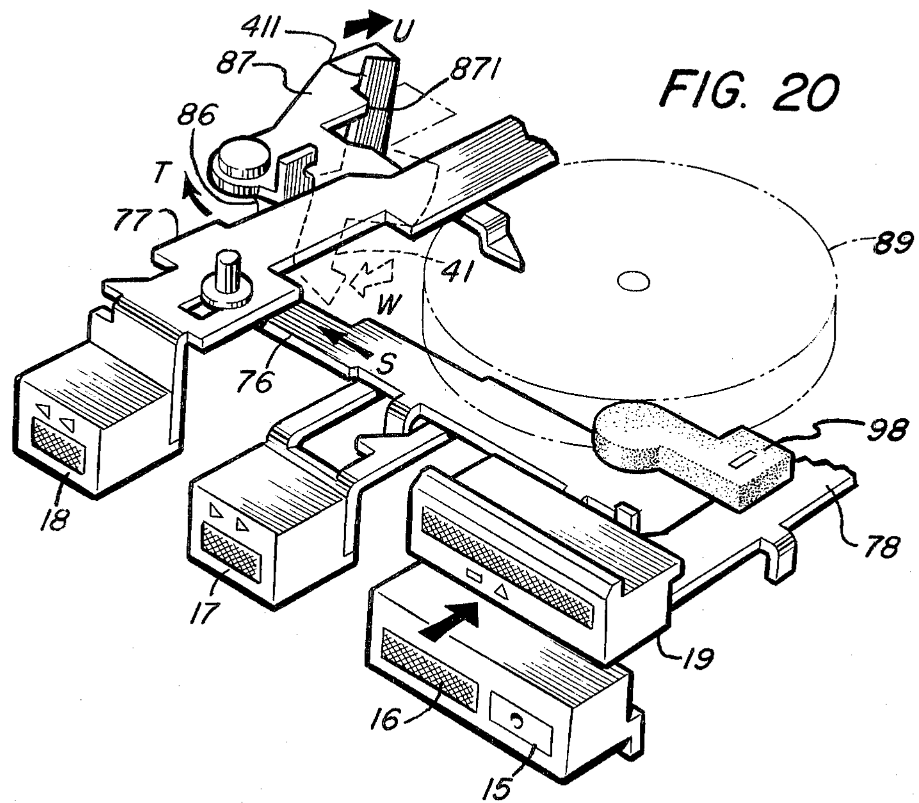
FIG. 20 is a perspective view of part of the operating mechanism for explaining the ejection operation.

Next, assume the STOP-EJECT button 19 is pressed again. As shown in FIG. 20, slider 76 slides in the direction of arrow S. Protrusion 763 of slider 76 pushes one end of driving lever 86 to turn lever 86 in the direction of arrow T. The lever 87 moves in the direction of arrow U and the ejection lever 87 turns in the direction of arrow W, since its tab 411 is pressed by step 871 of lever 87. As a result, the ejection operation is achieved. That is, the first depression of button 19 releases button 16 from the locked condition, and the second depression achieves the ejection operation.

Figure 21:
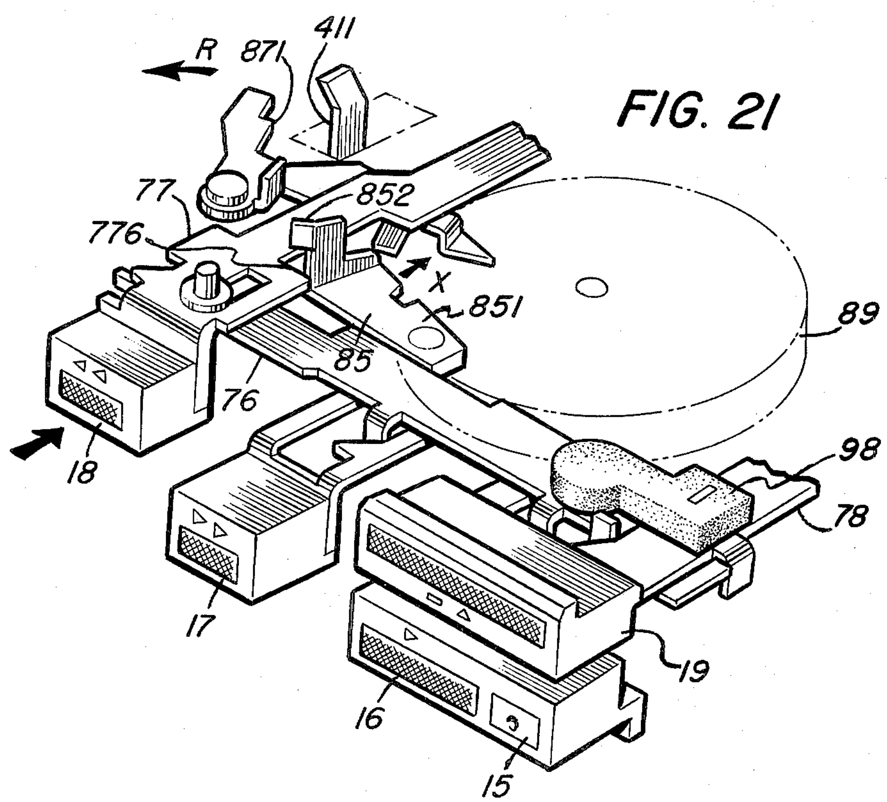
FIG. 21 is a perspective view of part of the operating mechanism for explaining the rewinding operation.

Further, assume REW button 18 is pressed. As shown in FIG. 21, step 776 of REW operation slider 77 presses driving lever 85 and turns it in the direction of arrow X. The lever 85 presses one end of ejection lever 87 to turn lever 87 in the direction of arrow R. Step 871 of lever 87 moves so that it does not oppose tab 411 of ejection element 41. As a result, the tape is rewound.

Now, assume STOP-EJECT button 19 is pressed in the rewinding condition. As mentioned above relative to FIG. 19, the lock plate 76 slides in the direction of arrow S, and then releases REW button 18 from the locked condition. Furthermore, the brake member 98 contacts flywheel 89 to stop its rotation and to stop tape transportation. At this time, in response to the movement of lever 76 ejection lever 87 moves in the direction of arrow V, then in the direction of arrow U. Likewise, step 871 of the lever 87 does not engage tab 411 of ejection element 41. When button 19 is pressed again, the ejection operation occurs as mentioned above relative to FIG. 20.

Now, assume FF button 17 is pressed. The tab 663 of FF operation slider 66 presses driving lever 85, and turns it in the direction of arrow X in FIG. 21. Ejection lever 87 moves as mentioned above relative to FIG. 21 to fast foward the tape. When STOP-EJECT button 19 is pressed, button 17 is released from the locked condition and brake member 98 contacts flywheel 89 as mentioned above to stop tape transportation. Also, ejection lever 87 moves as mentioned above. When button 19 is pressed again, the ejection operation is achieved in accordance with the procedure discussed above.

Since brake member 98 is attached directly to STOP-EJECT operation slider 78, the rotation of flywheel 89 may be stopped only by pressing STOP-EJECT button 19. Accordingly, tape transporation may be stopped irrespective of its direction. Also, double ejection operation is reliably achieved via lock plate 76 in response to two depressions of STOP-EJECT button 19. Therefore, the construction of the operating mechanism 12 may be simple.

Figure 22:
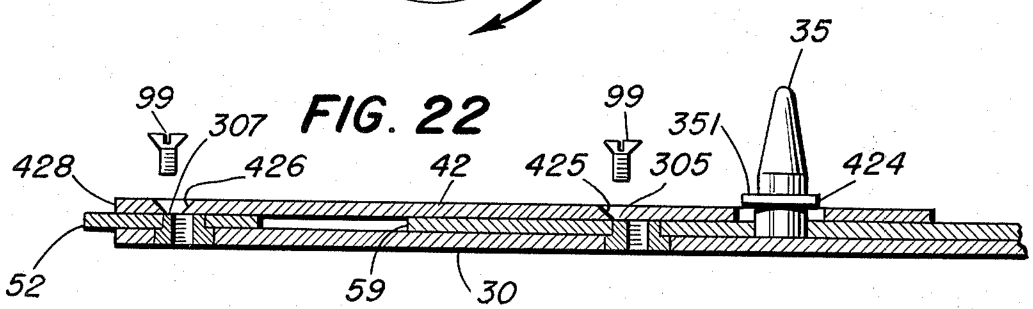
FIGS. 22 and 23 are cross-sectional views of part of the operating mechanism for explaining how to attach a blind plate to the chassis.

Next, the attachment of blind plate 42 to chassis 30 will be described. As shown in FIG. 5, plate 42 has holes 421 and 422 which receive reel holders 31–32. Plate 42 also has half-circle shaped holes 423 and 424 which receive guide pins 34–35. Apertures 425 to 427 are located at positions opposite pins 305, 307 and 308 of chassis 30. A screw aperture is located at the end of each pin 305, 307 and 308. As shown in FIG. 22, pins 305 and 307 of chassis 30 slidably support reproducing operation slider 59 and transmission element 52, respectively. Initially, blind plate 42 is put on slider 59 and transmission element 52. When plate 42 is inclined, its holes 423–424 receive guide pins 34–35. Plate 42 is positioned to cover the slider 59 and element 52. Each guide pin 34–35 has a brim 341, 351 positioned above slider 59 and plate 42.

Figure 23:
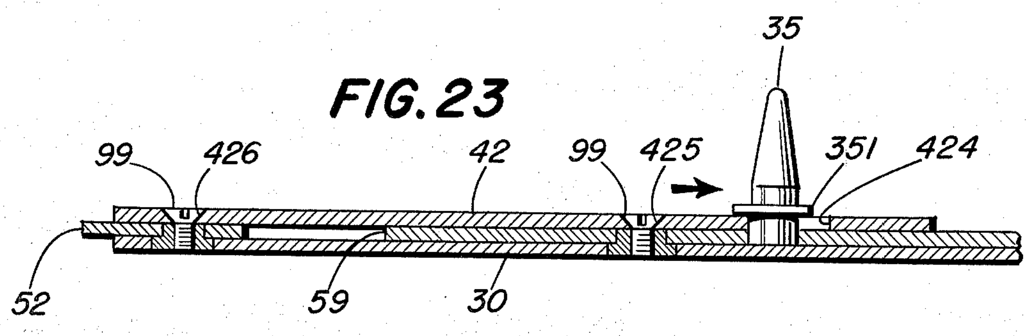

As shown in FIG. 23, plate 42 slides to the right in response to the bias of plate spring 36 (see FIG. 5). Plate 42 moves until it is inserted between the brims 341, 351 and the slider holes 423, 424 contact pins 34, 35, respectively. Then plate 42 is fixed to chassis 30 by screws 99. Thus, as mentioned above, the attachment of plate 42 to chassis 30 is easy. The action of operating mechanism 12 may be checked before plate 42 is finally fixed to chassis 30 by screws 99.

Figure 24:
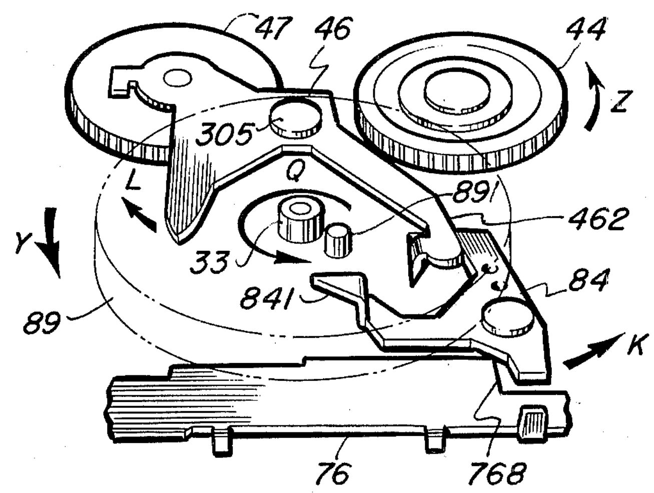
FIGS. 24 and 25 are perspective views of part of the operating mechanism for explaining the automatic stop operation mechanism.

Next, the automatic stop operation (ASO) mechanism will be described with reference to FIG. 24. When operating mechanism 12 is in the reproducing condition, as shown in FIG. 24, flywheel 89 turns in the direction of arrow Y to supply a rotation force to gear 44 via gear pulley 81 and gear 45. Accordingly, gear 44 and reel holder 32 (see FIG. 5) are turned in the direction of arrow Z. Since lock release lever 84 is biased by torsion spring 785 (see FIG. 6) in the direction of arrow K, extension 462 of ASO lever 46 is biased in the direction of arrow L. The other end of lever 84 opposes step 768 of lock plate 76. Furthermore, a pin 891 is attached to the surface of flywheel 89 in the neighborhood of its rotation axis (i.e., capstan 33). In the reproducing condition, pin 891 does not contact the triangular end 841, which is located in the center of lock release lever 84.

Figure 25:
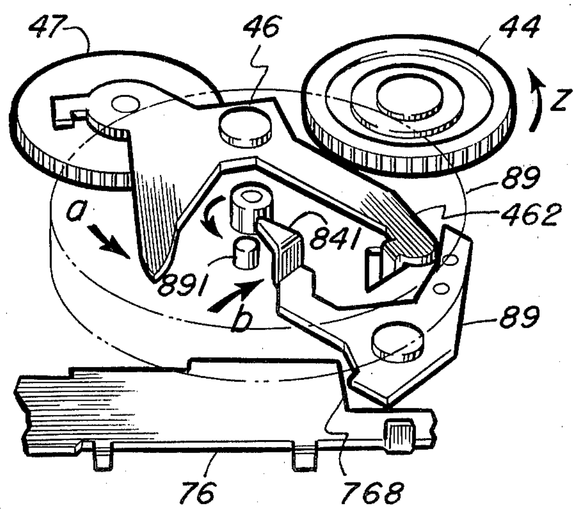

As shown in FIG. 25, when the tape transportation is completed, the rotation of reel holder 32 stops. However, gear 44, which frictionally engages reel holder 32, continues to turn in the direction of arrow Z. Accordingly, the tape is stretched and ASO lever 46 is turned in the direction of arrow (a). Lock release lever 84 is pressed by extension 462 of lever 41 and turned slightly in the direction of arrow (b). At this time, end 841 of slider 84 is positioned within the rotation course of pin 891 of flywheel 89. When lever 84 is hit by pin 891, it turns in the direction of arrow (b). At this time, the other end of lever 84 pushes step 768 of plate 76 to slide plate 76 to the left and release PLAY operation slider 59 from its locked condition. As a result, the automatic stop operation is achieved.

Figure 26:
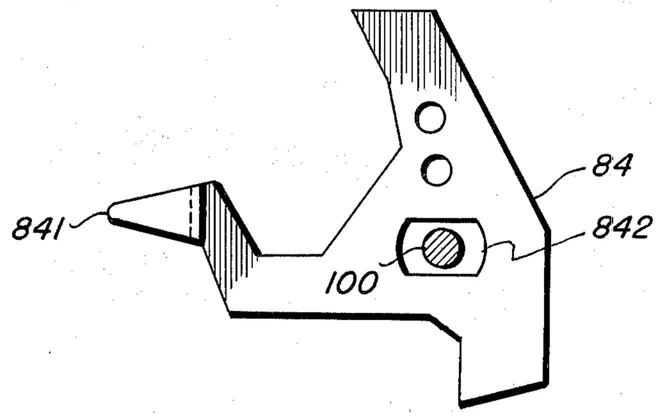
FIG. 26 is a plan view of a lock release lever of the operating mechanism.

Referring to FIGS. 26 and 27, the automatic stop operation will now be described in greater detail. First, referring to FIG. 26, lock release lever 84 has a rectangular shaped hole 842 near its center. This lever 84 is rotatably supported by a pin 100 of chassis 30 which passes through hole 842. As shown in FIG. 27(*a*), when lock release lever 84 is turned only by ASO lever 84, it does not move a sufficient distance to slide lock plate 76. At this time, pin 100 is in the left side of hole 842. As shown in FIG. 27(*b*), when end 841 is hit by pin 891 of flywheel 89, lever 84 is turned as pin 100 moves to right side of hole 841. At this time, lock plate 76 slides for the first time and the automatic stop operation is achieved. Similarly, the automatic stop operation is achieved in the recording condition.

Referring to FIGS. 28(*a*) and (*b*), the automatic stop operation is further described. First, referring to FIG. 4, the tab 463 of extension 462 of ASO lever 46 opposes incline 597 of slider 59. As shown in FIG. 28(*a*), incline 597 engages tab 463 of extension 462 when the tape is not transported. Accordingly, ASO lever 46 is not turned around its axis 305. As shown in FIG. 28(*b*), in the reproducing condition, tab 463 of extension 462 is separated from step 597 of slider 59 in response to movement of slider 59. Accordingly, lever 46 can turn and the automatic stop operation can be performed.

In the fast forwarding and rewinding conditions, the automatic stop operation is not performed as described above in relation to FIG. 28(*a*).

Figure 29A:
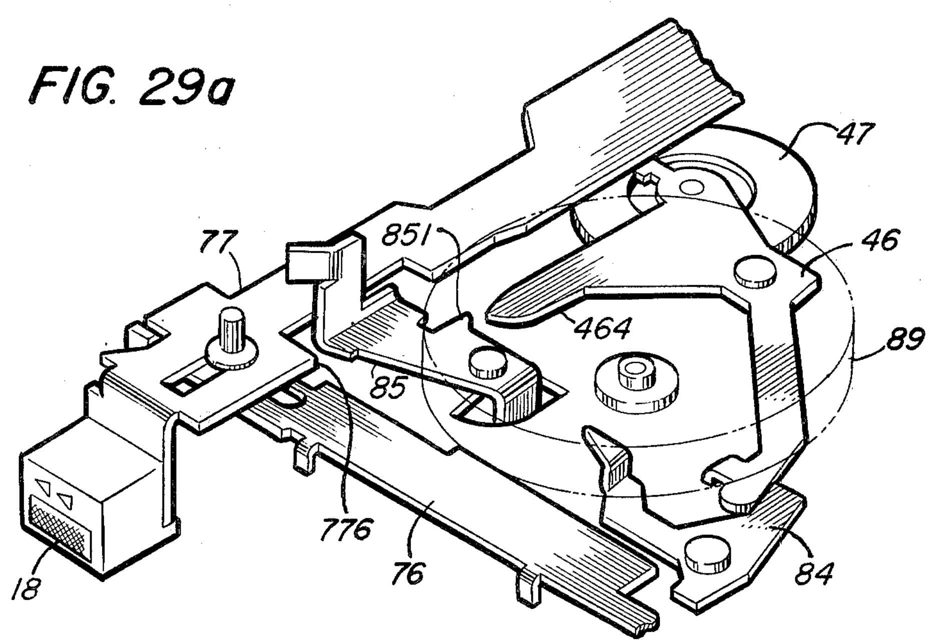
FIGS. 29(*a*) and (*b*) are perspective views showing varied conditions of part of the operating mechanism for prevention of the automatic stop operation.
Figure 29B:
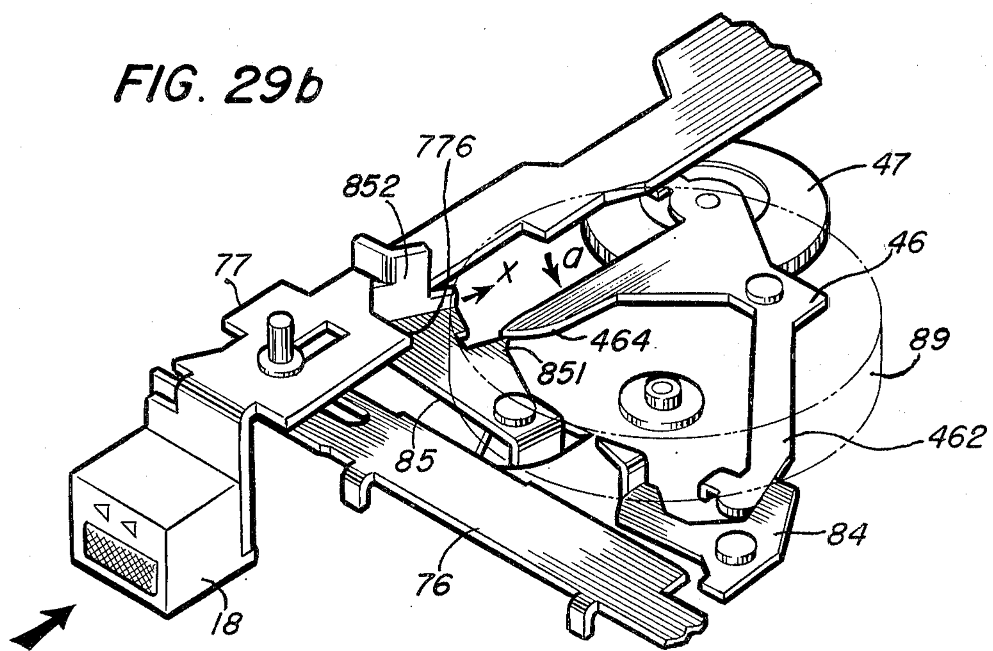

Referring to FIGS. 29(*a*) and (*b*), a procedure is described for preventing the automatic stop operation in the REVIEW condition (reproducing/rewinding/reproducing). As shown in FIG. 29(*a*), tab 852 of linking lever 85 opposes step 776 of REW operation slider 77. Accordingly, as shown in FIG. 29(*b*), slider 77 presses the lever 85 in the direction of arrow X in response to the depression REW button 18. At this time, step 851 of linking lever 851 engages the protrusion 464 of ASO lever 46 to prevent lever 46 from turning in the direction of arrow (a). As a result, the automatic stop operation is not performed in the REVIEW condition.

Now, a procedure is described for preventing the automatic stop in the CUE condition (reproducing/fast forwarding/reproducing). Tab 663 of FF operation slider 66 turns lever 85 in the direction of arrow X (see FIG. 29(*b*)) in response to the depression of FF button 17. Accordingly, the automatic stop operation is not performed in the CUE condition.

The automatic stop operation is performed only in the recording and reproducing conditions and not in the fast forwarding, rewinding, REVIEW and CUE conditions. The ASO lever can only turn when the tape is transported at the normal speed. The ASO lever 41 is prevented from turning when the tape is transported at high speed.

Figure 30:
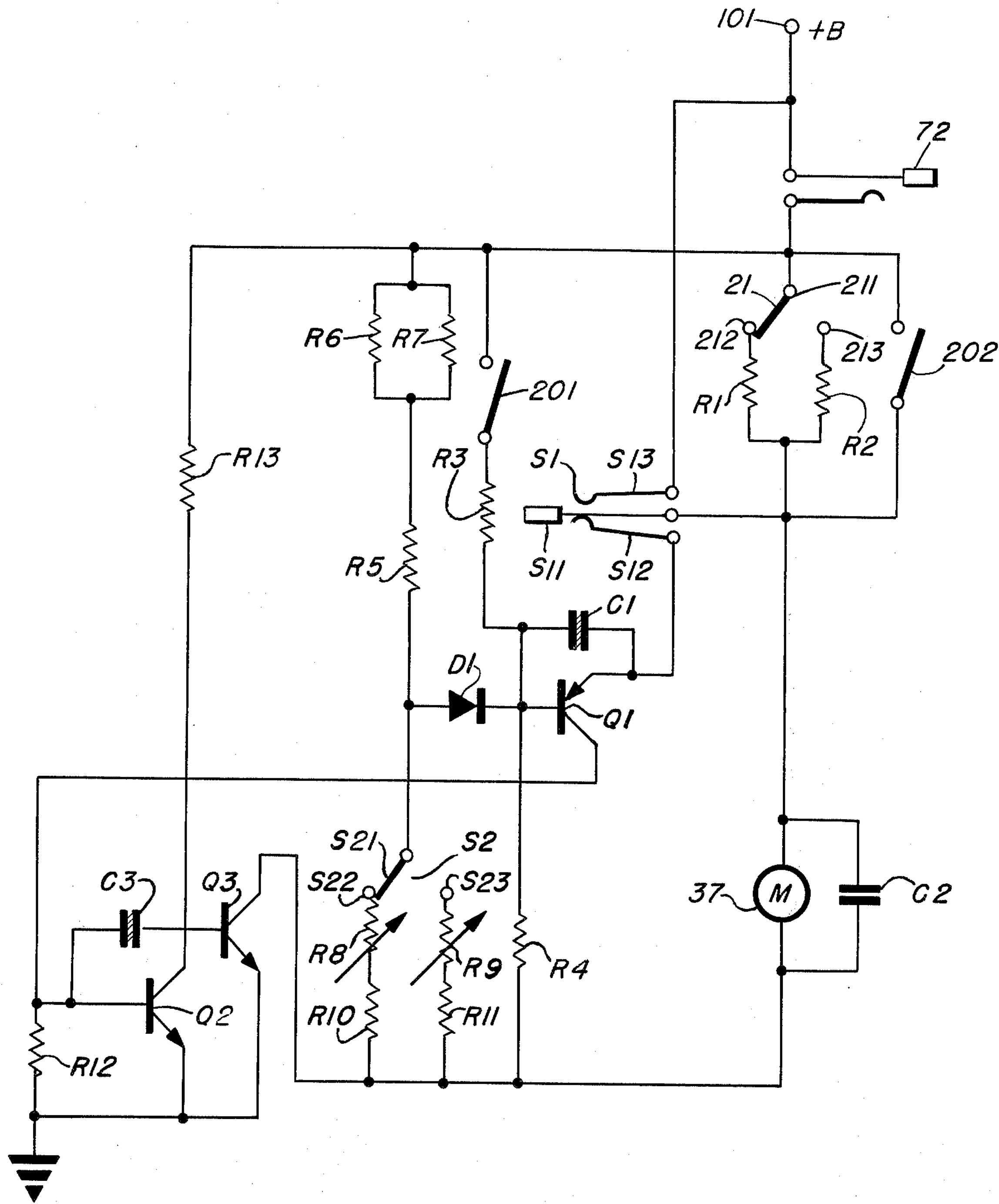
FIG. 30 is a circuit diagram of a DC voltage stabilization circuit.

The voltage stabilization circuit is shown in FIG. 30. Power source terminal 101 of DC voltage (+B) is coupled via switch 72 (see FIG. 7) to a selecting switch 21. Selecting switch 21 selects the tape transportation speed as either 1.2 cm/sec or 2.4 cm/sec in the recording and reproducing conditions. Selecting switch 21 has a contact 211 connected to a wiper arm which is coupled to terminal 101 and stationary contacts 212 and 213 connected together through resistors R1, R2. Resistors R1 and R2 are connected to motor 37 and switch S1. Switch S1 is responsive to the movement of the FF and REW operation sliders 66 and 77. A movable contact S11 of switch S1, which is connected to resistors R1 and R2, normally contacts stationary contact S12. Upon movement of slider 66 or 67, contact S11 contacts stationary contact S13. The contact S13 is connected to terminal 101 and contact S12 is connected to the emitter electrode of a PNP type transistor Q1.

The emitter electrode of transistor Q1 is also connected to switch 72 through a condenser C1, resistor R3 and switch 201. The switch 201 changes the tape transporting speed to a slower speed which is 10% less than the normal speed in the recording and reproducing conditions. The base electrode of transistor Q1 is connected to connection point of condenser C11 and resistor R3, and to motor 37 through resistor R4. The base electrode is also connected to the connection point of switches 72 and 21 through diode D1, resistor R5 and parallel resistors R6, R7. The connection point of diode D1 and resistor R5 is connected to the movable contact S21 of switch S2. Stationary contact S22 of switch S2 is connected to motor 37 through a variable resistor R8 and resistor R10 and another stationary contact S23 is connected to motor 37 through variable resistor R9 and resistor R11. A condenser C2 is connected in parallel with motor 37. The collector electrode of transistor Q1 is connected to the base electrode of transistor Q2, which is connected to ground through resistor R12. The collector electrode of the transistor Q2 is connected to the base electrode of a transistor Q3 and to the connection point of the switches 72, and 21 through a resistor R13. The base electrode of transistor Q3 is also connected to its base electrode through a condenser C3. The emitter electrodes of transistors Q2 and Q3 are connected to ground. The collector electrode of the transistor Q3 is connected to motor 37.

A switch 202 is connected in parallel with switch 21. The switch 202 changes the tape transportation speed to a speed 10% faster than the normal speed. The switches 201 and 202 are selectively turned on in response to operation of switch 20 (see FIG. 1).

An example of the operation of the voltage stabilization circuit is as follows. When PLAY button 16 is depressed, as shown in FIG. 8, and the switch 72 is turned on, then switches 21, S1, S2, 201 and 202 are in the condition illustrated in FIG. 30. The transistor Q1, which is biased by the input DC voltage (+B) through resistors R5 to R8 and R10, is turned on. The transistors Q2 and Q3 also are turned on. As a result, a steady voltage is supplied to motor 37 which sets the tape transportation speed at 1.2 cm/sec.

When switch 21 is switched to connect contact 211 and contact 213, the switch S2 is likewise switched contacts S21 and S23. The transistor Q1, which is now biased by the input DC voltage (+B) through resistors R5 to R7, R9 and R11, is turned on. Likewise, transistors Q2, Q3 are turned on. As a result, a steady voltage is supplied to motor 37 which sets the tape transportation speed at 2.4 cm/sec.

Assuming that switch 201 is turned on and switches 21 and S2 are maintained as shown in FIG. 30, the emitter electrode of the transistor Q1 is biased by a potential determined by the resistor R3. As a result, a voltage is generated and supplied to motor 37 which causes the tape transportation speed to decrease by 10% of 1.2 cm/sec. When switch 202 is turned on, a voltage is generated and supplied to motor 37 which causes the tape transportation speed to increase by 10% of 1.2 cm/sec. Similarly, when the tape transportation speed is 2.4 cm/sec, the speed may be increased or decreased by 10%.

In response to the depression of FF and REW buttons 17 and 18, switch S1 is switched so that contact S11 is connected to contact S13. Then the input voltage (+B) is supplied directly to motor 37. Accordingly, motor 37 operates at a higher speed to transport the tape at a higher speed.

The switch S1 is also switched in response to the movement of ASO lever 46, as shown in FIG. 31. A pair of movable contacts S11, which are connected together, engage tabs 465 and 466 of lever 46. In the condition of normal tape transportation speed, since lever 46 is biased in the direction of arrow L, its tab 465 presses contact S11 into contact with contact S12. At the end of the tape, lever 46 turns in the direction of arrow (*a*) and tab 466 pushes the contact S11 into contact with contact S13.

Finally, as shown in FIG. 32, switch S1 is attached to a printed electric wiring plate 102. The plate 102 is attached to the rear of chassis 30. The tabs 465 of lever 46 pass through a hole 103 and engage contacts S11, respectively.

Although an illustrative embodiment of the invention has been described in detail with reference to the accompanying drawings, it is understood that the invention is not limited to those precise embodiments. Various changes and modifications may be effected therein by one of skill in the art without departing from the scope or spirit of the invention.

I claim:

1. A magnetic reproducing apparatus for recording and reproducing information on magnetic tape comprising:

a main chassis (30);

a reproducing operation slider (59) mounted on said chassis to slide in its longitudinal direction;

a reproducing button (16) attached to one end of said slider;

a head lever (62) positioned at substantially a right angle to said slider, said head lever being rotatably mounted on said slider;

magnetic head means (39) attached to said lever for engaging said magnetic tape;

bias means (63) linking said lever to said slider or said button; and regulation means (598) on said slider for maintaining said lever at substantially a right angle to said slider.

2. The magnetic reproducing appartus of claim 1 further comprising;

a fast forward operation slider (66) mounted on said chassis to slide in its longitudinal direction;

a fast forward button (17) attached to one end of said fast forward operation slider;

a transmission lever (64) rotatably mounted on said reproducing slider, said transmission lever having an arm (641);

a tab (623) on said head lever which opposes said arm of said transmission lever; and a linking lever (85) rotatably mounted on said chassis, one end of said linking lever penetrating a hole (759) in said chassis to engage said arm of said transmission lever, the other end of said linking lever opposing a tab (663) on said fast forward operation slider to slightly rotate said head lever when said fast forward button is depressed in the reproducing condition to disengage said magnetic head from said magnetic tape.

3. The magnetic reproducing apparatus of claim 1 further comprising:

a rewinding operation slider (77) mounted on said chassis to slide in its longitudinal direction, said rewinding operation slider having a step (776) opposing said other end of said linking lever; and a rewinding button (18) attached to one end of said rewinding operation slider, said step of said rewinding operation slider being responsive to the depression of said rewinding button to slightly rotate said linking lever and said head lever to disengaging said magnetic head from said magnetic tape in the reproducing condition.

4. The magnetic reproducing apparatus of claim 2 or 3 further comprising:

a recording operation slider (49) mounted on said chassis to slide in its longitudinal direction;

a recording button (15) attached to one end of said recording operation slider, said recording button passing through a hole (161) in said reproducing button;

a lock element (50) rotatably mounted on said chassis, said lock element having one protrusion (502) engaging a tab (593) on said reproducing operation slider to oppose rotation of said lock element, a second protrusion (501) engaging a tab (492) on said recording operation slider when said reproducing and recording buttons are pressed together and one tab (503) engaging a second arm (642) of said transmission lever to oppose rotation of said lock element when said reproducing button is pressed; and bias means (51) for rotatably biasing said lock element;

whereby said recording operation slider is released from said lock element when either of said fast forward or said rewinding buttons is depressed in the recording condition.

* * * * *